United States Patent
Ha

(10) Patent No.: US 12,348,703 B2
(45) Date of Patent: Jul. 1, 2025

(54) DISPLAY DEVICE INCLUDING SWITCHABLE LENS LAYER AND RESIN FOR DISPLAYING A THREE-DIMENSIONAL (3D) IMAGE AND A TWO-DIMENSIONAL (2D) IMAGE

(71) Applicant: SAMSUNG DISPLAY CO., LTD., Yongin-si (KR)

(72) Inventor: Young Sang Ha, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 139 days.

(21) Appl. No.: 18/131,206

(22) Filed: Apr. 5, 2023

(65) Prior Publication Data
US 2023/0421748 A1  Dec. 28, 2023

(30) Foreign Application Priority Data
Jun. 24, 2022  (KR) .................. 10-2022-0077376

(51) Int. Cl.
*H04N 13/359* (2018.01)
*H04N 13/305* (2018.01)
*H04N 13/398* (2018.01)

(52) U.S. Cl.
CPC ......... *H04N 13/359* (2018.05); *H04N 13/305* (2018.05); *H04N 13/398* (2018.05)

(58) Field of Classification Search
CPC .. H04N 13/359; H04N 13/305; H04N 13/398; H04N 13/322; H04N 13/356;
(Continued)

(56) References Cited

U.S. PATENT DOCUMENTS 7,058,252 B2 * 6/2006 Woodgate ............ H04N 13/361
385/11
2015/0331247 A1 * 11/2015 Srivastava ........... H04N 13/356
349/15
(Continued)

FOREIGN PATENT DOCUMENTS

CN  105334645 A  * 2/2016
CN  118466042 A  * 8/2024
(Continued)

OTHER PUBLICATIONS

Liang et al. "2D/3D Switchable Autostereoscopic Display Based on Polymer-Stabilized Blue-Phase Liquid Crystal Lens", Journal of Display Technology, vol. 8, Issue 10, Oct. 2012 (Year: 2012).*
(Continued)

*Primary Examiner* — Richard A Hansell, Jr.
(74) *Attorney, Agent, or Firm* — F. CHAU & ASSOCIATES, LLC

(57) ABSTRACT

A display device includes: a display panel displaying a three-dimensional (3D) image in a first mode and displaying a two-dimensional (2D) image in a second mode; a switchable lens layer disposed on the display panel and including a resin; a resin supply part connected to the switchable lens layer and supplying the resin to the switchable lens layer; and a magnetic field generator applying a magnetic field to the resin supply part when in the second mode, wherein the resin moves from the resin supply part to the switchable lens layer when in the first mode and is stored in the resin supply part when in the second mode.

20 Claims, 23 Drawing Sheets

(58) Field of Classification Search
CPC .......... G02B 3/14; G02B 30/28; G02B 30/00;
G02B 30/20; G02B 30/27; G02B 26/004;
G09F 19/12; G09F 19/125; G09G 3/20;
G09G 3/3208; H10K 59/00
See application file for complete search history.

(56) References Cited

U.S. PATENT DOCUMENTS

| | | | |
|---|---|---|---|
| 2016/0011427 A1* | 1/2016 | Lin ........................ | G02B 30/27 349/15 |
| 2017/0213488 A1* | 7/2017 | Koo ....................... | G06F 1/1652 |
| 2018/0180966 A1* | 6/2018 | Song ........................ | G02F 1/09 |

FOREIGN PATENT DOCUMENTS

| | | | | |
|---|---|---|---|---|
| GB | 2389192 A | * | 12/2003 | ......... G02B 27/2214 |
| KR | 20130064333 A | * | 6/2013 | |
| KR | 10-1925459 | | 12/2018 | |
| KR | 10-2130138 | | 7/2020 | |
| WO | WO-03034748 A1 | * | 4/2003 | ........... G02B 26/005 |

OTHER PUBLICATIONS

Yuan et al., "Optofluidic Lenticular Lens Array for a 2D/3D Switchable Display", vol. 29, No. 23, Nov. 8, 2021, Optics Express, pp. 37419-37428.

* cited by examiner

DISPLAY DEVICE INCLUDING SWITCHABLE LENS LAYER AND RESIN FOR DISPLAYING A THREE-DIMENSIONAL (3D) IMAGE AND A TWO-DIMENSIONAL (2D) IMAGE

CROSS-REFERENCE TO RELATED APPLICATION

This application claims priority under 35 U.S.C. § 119 to Korean Patent Application No. 10-2022-0077376 filed on Jun. 24, 2022 in the Korean Intellectual Property Office, the disclosure of which is incorporated by reference herein in its entirety.

TECHNICAL FIELD

The present invention relates to a display device, and more particularly, to a display device that displays a three-dimensional (3D) image and a two-dimensional (2D) image.

DISCUSSION OF THE RELATED ART

Recently, a stereoscopic image display device and a viewing angle control display device that divide and display an image of a display device on a space of a front surface of the display device, which uses an optical member, have been under development.

The stereoscopic image display device displays a left-eye image and a right-eye image separately to make a user realize a three-dimensional effect according to binocular parallax. The stereoscopic image display device may be one of two types, a stereoscopic image display device using a stereoscopic technique and a stereoscopic image display device using an auto stereoscopic technique. Generally, the stereoscopic image display device using a stereoscopic technique uses parallax images of left and right eyes with a large stereoscopic effect, and includes a stereoscopic image display device using a glasses manner and a stereoscopic image display device using a non-glasses manner. The stereoscopic image display device using a glasses manner displays left and right parallax images in a state in which polarization of left and right parallax images is changed and implements a stereoscopic image using polarized glasses or implements a stereoscopic image using shutter glasses.

The stereoscopic image display device using a non-glasses manner implements a stereoscopic image by separating optical axes of left and right parallax images displayed on the display device using an optical member such as a parallax barrier or a lenticular sheet.

SUMMARY

Aspects of the present inventive concept provide a display device configured to provide a three-dimensional (3D) image and a two-dimensional (2D) image.

According to an embodiment of the present invention, a display device includes: a display panel displaying a three-dimensional (3D) image in a first mode and displaying a two-dimensional (2D) image in a second mode; a switchable lens layer disposed on the display panel and including a resin; a resin supply part connected to the switchable lens layer and supplying the resin to the switchable lens layer; and a magnetic field generator applying a magnetic field to the resin supply part when in the second mode, wherein the resin moves from the resin supply part to the switchable lens layer when in the first mode and is stored in the resin supply part when in the second mode.

In an embodiment of the present invention, a first surface of the switchable lens layer has a plurality of lenses in the first mode, and has a flat shape in the second mode.

In an embodiment of the present invention, a first length of the first surface of the switchable lens layer in a first direction in the first mode is greater than a second length of the first surface of the switchable lens layer in the first direction, in the second mode.

In an embodiment of the present invention, in the first mode, any one of the plurality of lenses has a curved shape.

In an embodiment of the present invention, the display device further includes a cover window disposed on the switchable lens layer and having a shape complementary to a shape of the plurality of lenses.

In an embodiment of the present invention, the switchable lens layer is in contact with the cover window in the first mode.

In an embodiment of the present invention, the display device further includes a space between the switchable lens layer and the cover window in the second mode.

In an embodiment of the present invention, the display device further includes a plurality of fixing pins disposed on the switchable lens layer and extending in a first direction, wherein a pitch of the plurality of lenses is defined in a second direction crossing the first direction.

In an embodiment of the present invention, each of the plurality of fixing pins is disposed between lenses neighboring to each other among the plurality of lenses, in the first mode.

In an embodiment of the present invention, the display panel includes a plurality of pixels each including an emission area, and the plurality of fixing pins do not overlap the emission area.

In an embodiment of the present invention, the plurality of fixing pins include a transparent material.

In an embodiment of the present invention, the resin includes a material that moves according to the magnetic field.

In an embodiment of the present invention, the resin includes $ZrO_2$ or $Fe_3O_4$.

In an embodiment of the present invention, the display device further includes: a connection part connected to the switchable lens layer; and a winding part connected to the connection part, wherein the winding part unwinds the connection part when in the first mode, and winds the connection part when in the second mode.

According to an embodiment of the present invention, a display device includes: a display panel displaying a 3D image in a first mode and displaying a 2D image in a second mode; a switchable lens layer disposed on the display panel and including a resin; a plurality of fixing pins disposed on the switchable lens layer; and a resin supply part connected to the switchable lens layer and supplying the resin to the switchable lens layer, wherein the switchable lens layer has a plurality of lenses in the first mode because the resin moves from the resin supply part to the switchable lens layer in the first mode, and the switchable lens layer has a flat shape in the second mode because the resin is stored in the resin supply part in the second mode, and each of the plurality of fixing pins is disposed between lenses neighboring to each other among the plurality of lenses.

In an embodiment of the present invention, the display panel includes a plurality of pixels each including an emission area, and the plurality of fixing pins do not overlap the plurality of emission areas.

In an embodiment of the present invention, in the first mode, any one of the plurality of lenses has a curved shape.

In an embodiment of the present invention, the display device further includes: a connection part connected to the switchable lens layer; and a winding part connected to the connection part, wherein the winding part unwinds the connection part when in the first mode, and winds the connection part when in the second mode.

According to an embodiment of the present invention, a display device includes: a display panel displaying a 3D image in a first mode and displaying a 2D image in a second mode; a switchable lens layer disposed on the display panel and including a resin; a cover window disposed on the switchable lens layer and including a plurality of grooves facing the switchable lens layer; and a resin supply part connected to the switchable lens layer and supplying the resin to the switchable lens layer, wherein the switchable lens layer has a plurality of curves because the resin move from the resin supply part to the switchable lens layer in the first mode, and has a flat shape because the resin is stored in the resin supply part in the second mode, and wherein the cover window is disposed on the switchable lens layer and has a shape complementary to a shape of the plurality of curves.

In an embodiment of the present invention, the cover window is in contact with the switchable lens layer in the first mode.

BRIEF DESCRIPTION OF THE DRAWINGS

The above and other features of the present invention will become more apparent by describing in detail embodiments thereof with reference to the attached drawings, in which.

DETAILED DESCRIPTION OF THE EMBODIMENTS

Embodiments of the present invention will now be described more fully hereinafter with reference to the accompanying drawings, in preferred embodiments of the present invention are shown. This invention may, however, be embodied in different forms and should not be construed as limited to the embodiments set forth herein.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the spirit and scope of the present invention. Similarly, the second element could also be termed the first element.

Hereinafter, embodiments of the present invention will be described with reference to the accompanying drawings.

Figure 1:
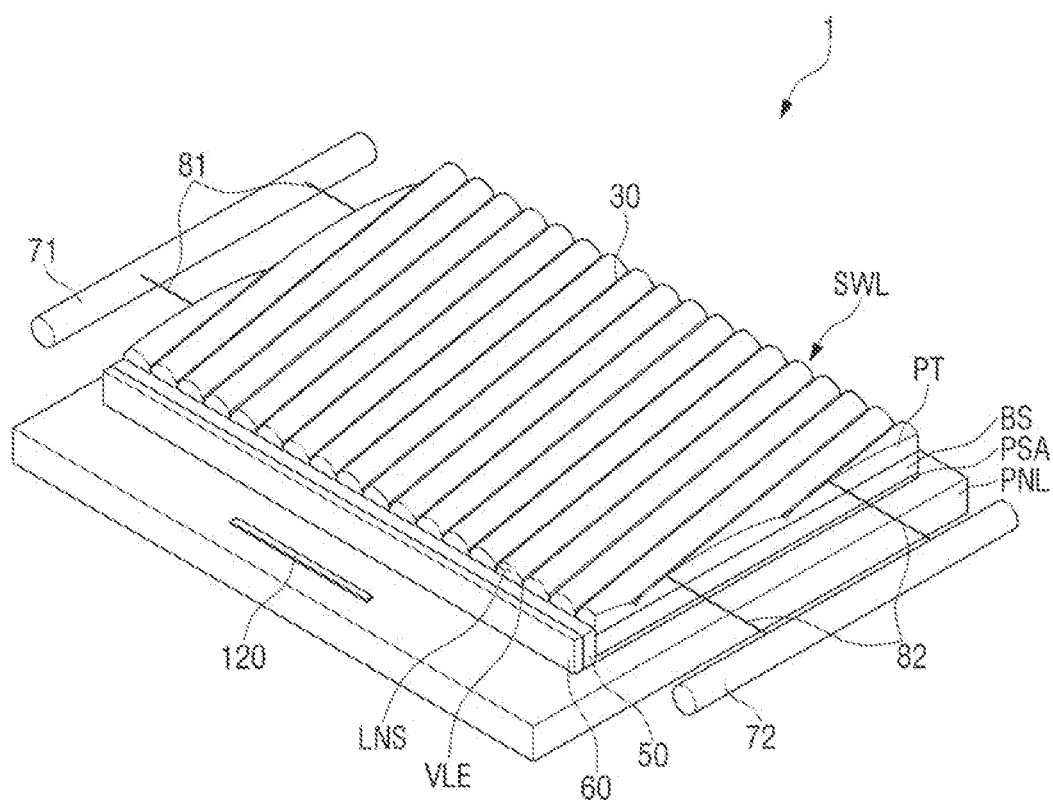
FIG. 1 is a perspective view illustrating a display device according to an embodiment of the present invention.
Figure 2:
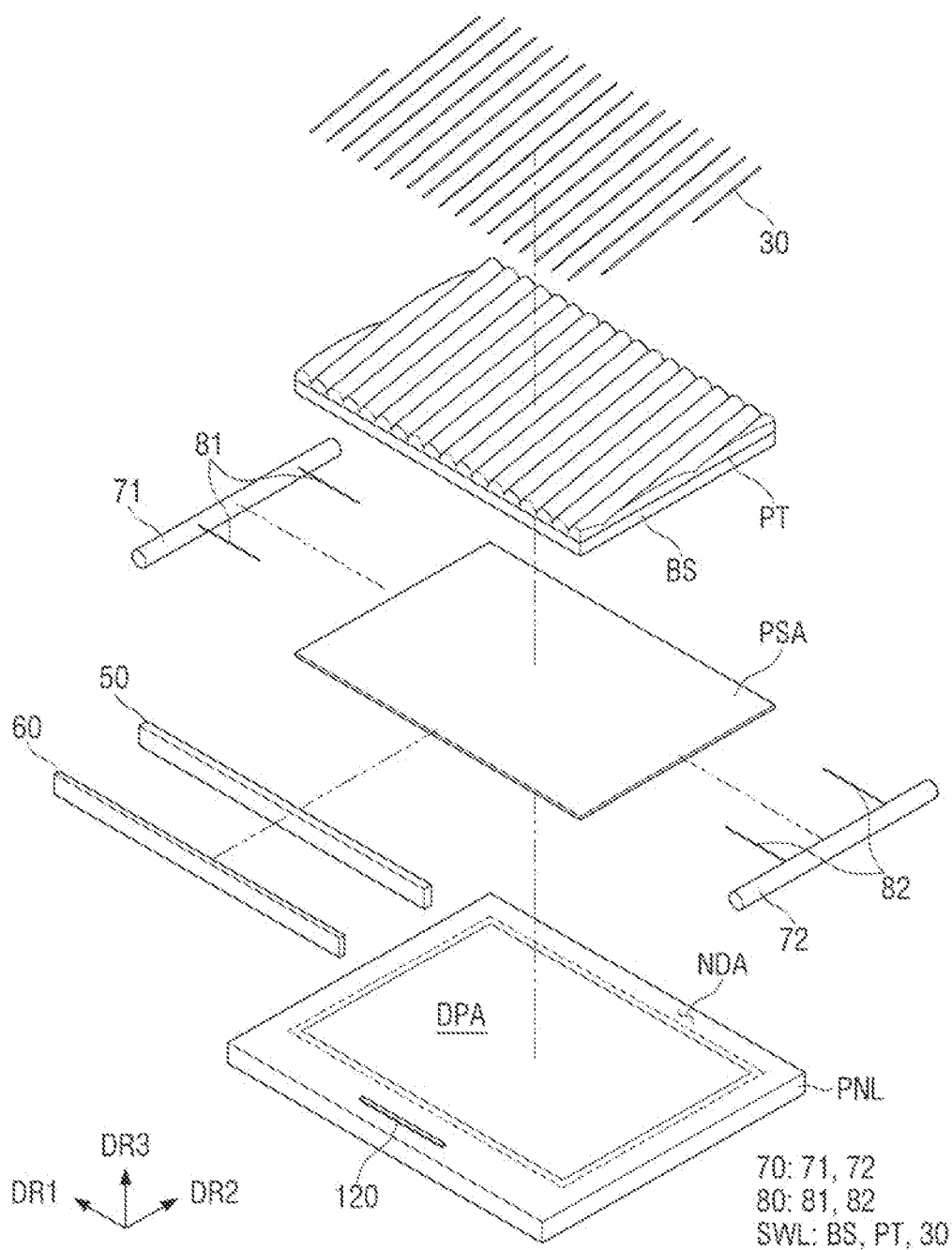
FIG. 2 is an exploded perspective view illustrating the display device according to an embodiment of the present invention.

FIG. 1 is a perspective view illustrating a display device according to an embodiment of the present invention. FIG. 2 is an exploded perspective view illustrating the display device according to an embodiment of the present invention.

Hereinafter, a first direction DR1, a second direction DR2, and a third direction DR3 are different directions from each other, and cross each other. In an embodiment of the present invention, the first direction DR1, the second direction DR2, and the third direction DR3 may vertically cross each other. For example, the first direction DR1 may be a longitudinal direction, and the second direction DR2 may be a transverse direction. As an additional example, the third direction DR3 may be a thickness direction.

Referring to FIGS. 1 and 2, a display device 1 is a device that displays a moving image or a still image. The display device 1 may refer to all electronic devices that include display screens. For example, televisions, laptop computers, monitors, tablet personal computers (PCs), navigation devices, vehicle displays, mobile phones, smartphones, electronic watches, smart watches, watch phones, mobile communication terminals, electronic notebooks, electronic books, portable multimedia players (PMPs), game machines, digital cameras, billboards, the Internet of Things (IoT), and the like, which include display screens, may be included in the display device 1.

The display device 1 may be a light field display device that provides different image information for each position. For example, the display device 1 may provide image information by dividing an image that is displayed on a display panel PNL, which is on a space of a front surface of the display device 1, by using a lens array SWL. By appropriately utilizing such an image information transfer manner, the display device 1 may be utilized as a stereoscopic image display device that provides a three-dimensional (3D) image or a viewing angle control display device that displays different images to users positioned at different viewing angles.

A shape of the display device 1 in plan view is not limited. For example, the shape of the display device may be modified into various shapes such as rectangular shape, a square shape, a rhombic shape, other polygonal shapes, a circular shape, an elliptical shape, and the like, according to a field to which the display device 1 is applied. The shape of the illustrated display device 1 in plan view is a rectangular shape of which long sides are positioned in parallel with the first direction DIU.

The display device 1 may include the display panel PNL, the lens array SWL, and a coupling member PSA that couples the lens array SWL to the display panel PNL. In addition, the display device 1 may include a resin supply part 50, a magnetic field generation part (e.g., a magnetic field generator) 60, and a rolling part 70.

The display panel PNL includes a display screen. In the illustrated display device 1, a direction in which the display panel PNL provides the display screen is one side (e.g., an upward direction) of the third direction DR3. The display panel PNL may have a shape substantially similar to that of the display device 1, in plan view.

Examples of the display panel PNL may include an organic light emitting display panel, an inorganic light emitting display panel, a micro light emitting diode (LED) display panel, a nano LED display panel, a quantum dot light emitting display panel, a liquid crystal display panel, a plasma display panel, a field emission display panel, an electrophoretic display panel, an electro-wetting display panel, and the like. Hereinafter, a case where an organic light emitting display panel is applied as an example of the display panel PNL, will be described by way of example, but the present invention is not limited thereto, and the same or similar technical idea may also be applied to other display panels if applicable.

The display panel PNL may have a shape similar to that of the display device 1, in plan view. For example, the display panel PNL may have a quadrangular shape, such as a rectangular shape in plan view.

The display panel PNL includes a display area DPA and a non-display area NDA. The display area DPA is an area in which a screen is displayed, and the non-display area NDA is an area in which the screen is not displayed. The non-display area NDA may be disposed around the display area DPA. When the display area DPA has a rectangular shape, the non-display area NDA may be disposed to at least partially surround four sides of the display area DPA, but the present invention is not limited thereto. For example, the non-display area NDA may be disposed only outside some of sides of the display area DPA. In some cases, the non-display area NDA may exist inside the display area DPA, and the ion-display area. NDA may be at least partially surrounded by the display area DPA.

The display panel PNL may include data lines, scan lines, and a plurality of pixels PX connected to the data lines and the scan lines, to display an image. The plurality of pixels PX may include a plurality of color pixels PX.

Each of the pixels PX may be connected to at least one scan line and at least one data line. Each of the pixels PX may include a thin film transistor, such as a driving transistor and at least one switching transistor, and a light emitting element. Each of the pixels PX may receive a data voltage of the data line when a scan signal is applied from the scan line to each of the pixels PX, and may emit light by supplying a driving current to the light emitting element according to a data voltage applied to a gate electrode of the driving transistor.

The coupling member PSA is disposed on one surface (e.g., a display surface) of the display panel PNL. The coupling member PSA may be optically transparent. The coupling member PSA may include, for example, an adhesive tape, an adhesive, a pressure sensitive adhesive, a coupling resin, and the like.

The lens array SWL is disposed on one surface of the coupling member PSA. The lens array SWL may be attached onto one surface of the display panel PNL through the coupling member PSA. The lens array SWL and the coupling member PSA may have the same shape as each other in plan view. The coupling member PSA may have a size smaller than or equal to that of the lens array SWL. The coupling member PSA might not protrude to the outside of the lens array SWL, but the present invention is not limited thereto.

A shape of the lens array SWL in plan view may be substantially the same as a shape of the display panel PNL in plan view. In plan view, a size of the lens array SWL may be smaller than or equal to a size of the display panel PNL. The lens array SWL is disposed to cover the entirety of the display area DPA of the display panel PNL. The lens array SWL may further cover a portion or the entirety of the non-display area NDA as well as the display area DPA of the display panel PNL. It has been illustrated in FIGS. 1 and 2 that the lens array SWL covers the entirety of the display area DPA and a portion of the non-display area NDA of the display panel PNL, and another portion of the non-display area NDA of the display panel PNL is exposed from the lens array SWL to the outside of the lens array SWL, but an arrangement of the lens array SWL is not limited thereto.

The lens array SWL may include a base BS, a switchable lens layer PT disposed on the base BS, and fixing pins 30 disposed on partial areas of the switchable lens layer PT.

The base BS may be a transparent film. The base BS may be made of a material generally applied to an optical film, such as polyethylene terephthalate (PET), polycarbonate (PC), polyethylene (PE), polypropylene (PP), polysulfone (PSF), polymethyl methacrylate (PMMA), triacetyl cellulose (TAC), cycloolefin polymer (COP), or cycloolefin copolymer (COC). A light transmittivity of the base BS may be about 90% or more, but the present invention is not limited thereto.

The switchable lens layer PT may include a transparent resin. The switchable lens layer PT may include a photocurable resin such as an epoxy acrylate-based resin, a urethane acrylate-based resin, or a silicone acrylate-based resin or a thermosetting resin such as an acrylic resin, a urethane-based resin, or a polyester-based resin. A resin constituting the switchable lens layer PT may have a light transmittivity of about 90% or more, but the present invention is not limited thereto.

The switchable lens layer PT may have a different shape depending on a two-dimensional (2D)/three-dimensional (3D) mode. The switchable lens layer PT includes a plurality of lenses LNS convexly protruding in the third direction DR3 in the 3D mode. The highest portion of the lens LNS is referred to as a peak (or, e.g., a top) of the lens LNS, and a portion positioned between lenses LNS neighboring to each other among the plurality of lenses, which is the lowest portion of the lens LNS, is referred to as a lens valley VLE. The lens valley VLE may be positioned at a boundary portion of each of the plurality of lenses LNS.

Each lens LNS may extend in one direction. For example, the lens LNS may be formed in a line shape in plan view. For example, as illustrated in FIGS. 1 and 2, each lens LNS may extend in the second direction DR2, which is a short side extension direction of the display device 1. The plurality of lenses LNS are arranged in a direction crossing an extension direction of each lens LNS. For example, the plurality of lenses LNS may be arranged along the first direction DR1.

Cross-sections of the respective lenses LNS cut in a direction perpendicular to the extension direction may have substantially the same shape and size. In an embodiment of the present invention, a cross-sectional shape of the lens LNS may be a portion of a circle or an ellipse. When the cross-sectional shape of the lens LNS is a portion of the circle, it may be a semicircle or a sectoral shape having a central angle less than 180°. In an embodiment of the present invention, the lens LNS may have an overall lenticular lens shape. The cross-sectional shape of the lens LNS may be a triangle or other polygons. For example, the lens LNS may have an overall prism lens shape.

The switchable lens layer PT may have a flat shape in the 2D mode. This will be described later with reference to FIG. 11.

The fixing pin 30 is disposed on the lens valley VLE. For example, the fixing pin 30 may be disposed between the lenses LNS neighboring to each other among the plurality of lenses LNS. When the lens valley VLE extends along the second direction DR2, the fixing pin 30 may also extend along the second direction DR2. Accordingly, a pitch of the fixing pins 30 in the first direction DR1 may be defined as a pitch of the plurality of lenses LNS in the first direction DR1. The fixing pin 30 may be made of a transparent material.

The resin supply part 50 may be disposed on one side surface of the switchable lens layer PT. For example, the resin supply part 50 may be disposed on one side surface of the switchable lens layer PT in the second direction DR2. However, the present invention is not limited thereto, and the resin supply part 50 may also be disposed on the other side surface of the switchable lens layer PT. For example, the resin supply part 50 may be a housing that houses a resin RS (see FIG. 6). The resin supply part 50 may be connected to the switchable lens layer PT to supply the resin RS (see FIG. 6) to the switchable lens layer PT. This will be described later with reference to FIG. 10.

The magnetic field generation part 60 may be disposed on one side surface of the resin supply part 50. For example, the magnetic field generation part 60 may be disposed on one side surface of the resin supply part 50 in the second direction DR2. The magnetic field generation part 60 does not generate a magnetic field in the 3D mode, and may generate a magnetic field in the second mode. Accordingly, the magnetic field generation part 60 may move the resin RS (see FIG. 6) from the resin supply part 50 to the switchable lens layer PT in the 3D mode or store the resin RS (see FIG. 5) in the resin supply part 50 in the 2D mode.

The rolling part 70 may be disposed on side surfaces of the switchable lens layer PT. For example, the rolling part 70 may be disposed on both side surfaces of the switchable lens layer PT in the first direction DR1. However, the present invention is not limited thereto, and the rolling part 70 may also be disposed on the other side surface of the switchable lens layer PT.

The rolling part 70 may be connected to a connection part 80. For example, a first winding part 71 may be connected to first connection parts 81, and a second winding part 72 may be connected to second connection parts 82. For example, the first winding part 71 and the second winding part 72 may each include rollers. The rolling part 70 may adjust a wound length of the connection part 80. For example, the rolling part 70 may roll in a direction in which it unwinds the winded connection part 80 in the 3D mode, and may roll in a direction in which it winds the connection part 80 in the 2D mode.

The connection part 80 may be connected to the rolling part 70. In addition, the connection part 80 may be connected to the switchable lens layer PT. For example, the first connection parts 81 may be connected to one side of the switchable lens layer PT in the first direction DR1, and the second connection parts 82 may be connected to the other side of the switchable lens layer PT in the first direction DR1. For example, the first connection parts 81 and the second connection parts 81 may be connectors, wires or the like for connecting to the rolling part 70 and the switchable lens layer PT and for being wound around the first and second winding parts 71 and 72. As described above, the first connection parts 81 are connected to the first winding part 71, and the second connection parts 82 are connected to the second winding part 72. Thus, the first winding part 71 and the second winding part 72 may adjust the switchable lens layer PT so that the switchable lens layer PT is tightened or loosened through the connection part 80. A description of the rolling part 70 and the connection part 80 will be provided later with reference to FIG. 7.

Figure 3:
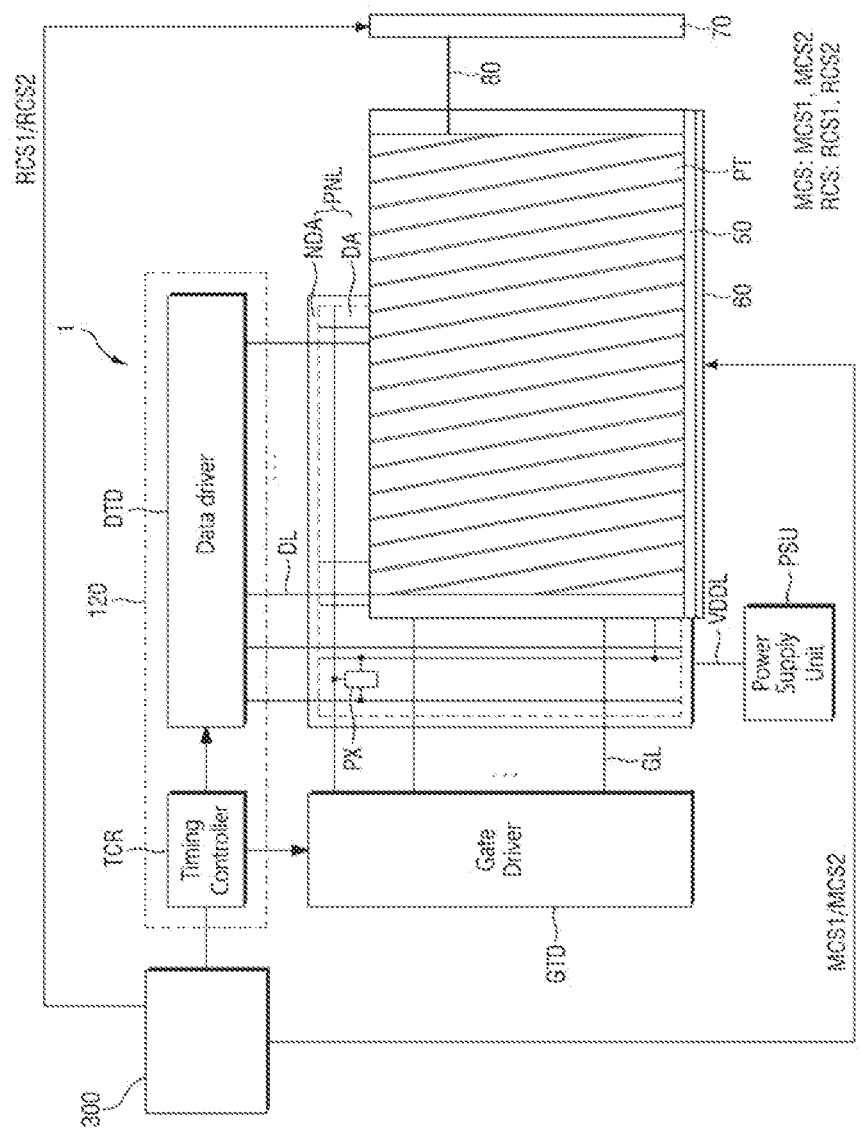
FIG. 3 is a block diagram illustrating a configuration of the display device according to an embodiment of the present invention.

FIG. 3 is a block diagram illustrating a configuration of the display device according to an embodiment of the present invention.

Referring to FIG. 3, the display device 1 may further include a plurality of data lines DL, a plurality of gate lines GL, a controller 300, a timing controller TCR, a data driver DTD, a gate driver GTD, a power supply unit PSU, the rolling part 70, and the magnetic field generation part 60.

The plurality of data lines DL may be connected between the data driver DTD and the plurality of pixels PX. The plurality of data lines DL may supply a data voltage to each of the plurality of pixels PX. The plurality of data lines DL may extend in the second direction DR2 and may be spaced apart from each other in the first direction DR1.

The plurality of gate lines GL may be connected between the gate driver GTD and the plurality of pixels PX. The plurality of gate lines GL may supply a gate signal to each of the plurality of pixels PX. The plurality of gate lines GL may extend in the first direction DR1 and may be spaced apart from each other in the second direction DR2.

The plurality of pixels PX may be disposed in each of pixel PX areas formed by the intersection of the plurality of data lines DL and the plurality of gate lines GL, respectively. Each of the plurality of pixels PX may be connected to at least one gate line GL, the data line DL, and a driving voltage.

The timing controller TCR may receive a light field image. The timing controller TCR may generate a data control signal and a gate control signal based on the light field image. The timing controller TCR may control a driving timing of the data driver DTD using the data control signal, and may control a driving timing of the gate driver GTD using the gate control signal. The timing controller TCR may generate pixel data based on output data generated by the controller 300, align the pixel data so as to be suitable for an arrangement structure of the pixels PX, and supply the pixel data to the data driver DTD.

The data driver DTD may receive the pixel data and the data control signal from the timing controller TCR. The data driver DTD may generate a data voltage based on the pixel data and may supply the data voltage to the data lines DL according to the data control signal. The data voltage may be supplied to the plurality of pixels PX through the data lines DL, and may determine luminance of the plurality of pixels PX.

The gate driver GTD may be provided in the non-display area. NDA of the display panel PNL. The gate driver GTD may generate gate signals based on the gate control signal GCS supplied from the timing controller TCR, and may sequentially supply the gate signals to the plurality of gate lines GL according to a set order.

The power supply unit PSU may supply a driving voltage to the display panel PNL. The power supply unit PSU may generate the driving voltage, and may supply the driving voltage to the plurality of pixels PX through a driving voltage line VDDL. The power supply unit PSU may generate a common voltage and may supply the common voltage to a low potential line of the display panel PNL. For example, the driving voltage may correspond to a high potential voltage capable of driving the plurality of pixels PX, and the common voltage may correspond to a low potential voltage commonly supplied to the plurality of pixels PX.

When the display device 1 provides a 3D image, the controller 300 may switch a mode to the first mode. When the display device 1 provides a 2D image, the controller 300 may switch a mode to the second mode. Hereinafter, a case of providing the 3D image will be referred to as the first mode, and a case of providing the 2D image will be referred to as the second mode.

The controller 300 may receive image data from a user or a host. For example, in the first mode, the controller 300 may generate 3D image information based on the received image data. In the second mode, the controller 300 may generate 2D image information based on the received image data. The controller 300 may output the image information to the timing controller TCR. For example, the controller 300 may output the 3D image information to the timing controller TCR in the first mode. The controller 300 may output the 2D image information to the timing controller TCR in the second mode.

The controller 300 may generate a magnetic field control signal MCS. For example, in the first mode, the controller 300 may generate a first magnetic field control signal MCS1 which is received by the magnetic field generation part 60 so that a magnetic field is not generated by the magnetic field generation part 60. In addition, in the second mode, the controller 300 may generate a second magnetic field control signal MCS2 which is received by the magnetic field generation part 60 so that a magnetic field is generated by the magnetic field generation part 60. The controller 300 may output the first magnetic field control signal MCS1 to the magnetic field generation part 60 in the first mode, and may output the second magnetic field control signal MCS2 to the magnetic field generation part 60 in the second mode. Accordingly, the magnetic field might not be applied from the magnetic field generation part 60, and the resin RS might not be stored in the resin supply part 50. For example, the controller 300 may control the resin RS to move from the resin supply part 50 to the switchable lens layer PT in the first mode, and the controller 300 may store the resin RS in the resin supply part 50 in the second mode.

In addition, the controller 300 may generate a rolling control signal RCS. For example, the controller 300 may generate a first rolling control signal RCS1 so that the switchable lens layer PT has a shape of the lens LNS in the first mode. In addition, the controller 300 may generate a second rolling control signal RCS2 so that one surface of the switchable lens layer PT has a flat shape in the second mode. The controller 300 may output the first rolling control signal RCS1 to the rolling part 70 in the first mode, and may output the second rolling control signal RCS2 to the rolling part 70 in the second mode. Accordingly, the controller 300 may control the rolling part 70 to adjust a length of one surface of the switchable lens layer PT that is connected to the rolling part 70.

The magnetic field generation part 60 may receive the magnetic field control signal MCS from the controller 300. For example, the magnetic field generation part 60 may receive the first magnetic field control signal MCS1 in the first mode, and may receive the second magnetic field control signal MCS2 in the second mode. The magnetic field generation part 60 may generate a magnetic field according to the magnetic field control signal MCS. For example, in the first mode, the magnetic field generation part 60 might not generate the magnetic field based on the first magnetic field control signal MCS1. In the second mode, the magnetic field generation part 60 may generate the magnetic field based on the second magnetic field control signal MCS2.

The rolling part 70 may receive the rolling control signal RCS from the controller 300. For example, the rolling part 70 may receive the first rolling control signal RCS in the first mode, and may receive the second rolling control signal RCS2 in the second mode. The rolling part 70 may generate winding according to the rolling control signal RCS. For example, in the first mode, the rolling part 70 may roll in one direction based on the first rolling control signal RCS1. In the second mode, the rolling part 70 may roll in a direction opposite to the one direction based on the second rolling control signal RCS2.

The magnetic field generation part 60 may receive the first magnetic field control signal MCS1 in the first mode, and might not generate the magnetic field in the first mode. In addition, in the first mode, the rolling part 70 may receive the first rolling control signal RCS1 and may roll in a first rotation direction RR1 (see FIG. 7). Accordingly, the magnetic field generation part 60 and the rolling part 70 may perform control so that the resin RS (see FIG. 6) is disposed on the switchable lens layer PT. Accordingly, the switchable lens layer PT may have a shape of the plurality of lenses LNS in the first mode. For example, in the first mode, the switchable lens layer PT may have a surface with a plurality of curves to form the shape of the plurality of lenses LNS.

In the second mode, the magnetic field generation part 60 may receive the second magnetic field control signal MCS2, and may generate the magnetic field. In addition, in the second mode, the rolling part 70 may receive the second rolling control signal RCS2 and may roll in a second rotation direction RR2 (see FIG. 14). Accordingly, the magnetic field generation part 60 and the rolling part 70 may perform their respective functions in the second mode so that the resin RS (see FIG. 6) is disposed on the resin supply part 50. As described later, the switchable lens layer PT may have a flat shape in the second mode.

Figure 4:
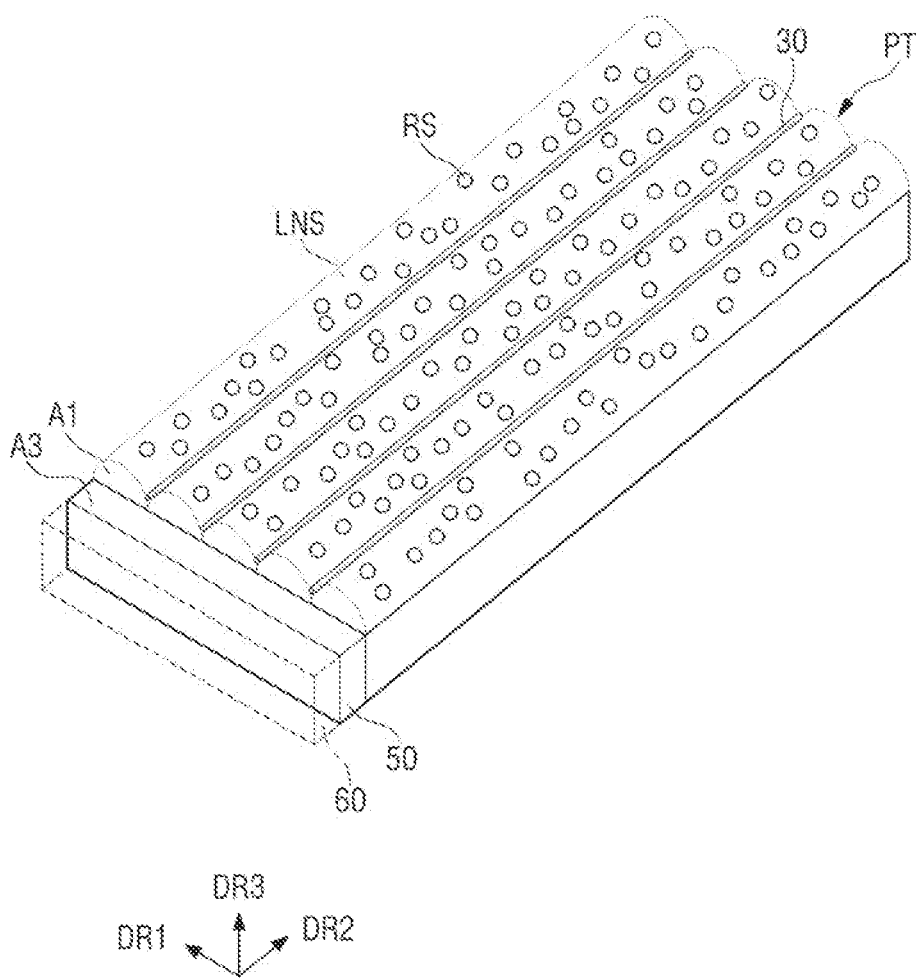
FIG. 4 is a perspective view illustrating a switchable lens layer and a resin storage part in a first mode.
Figure 5:
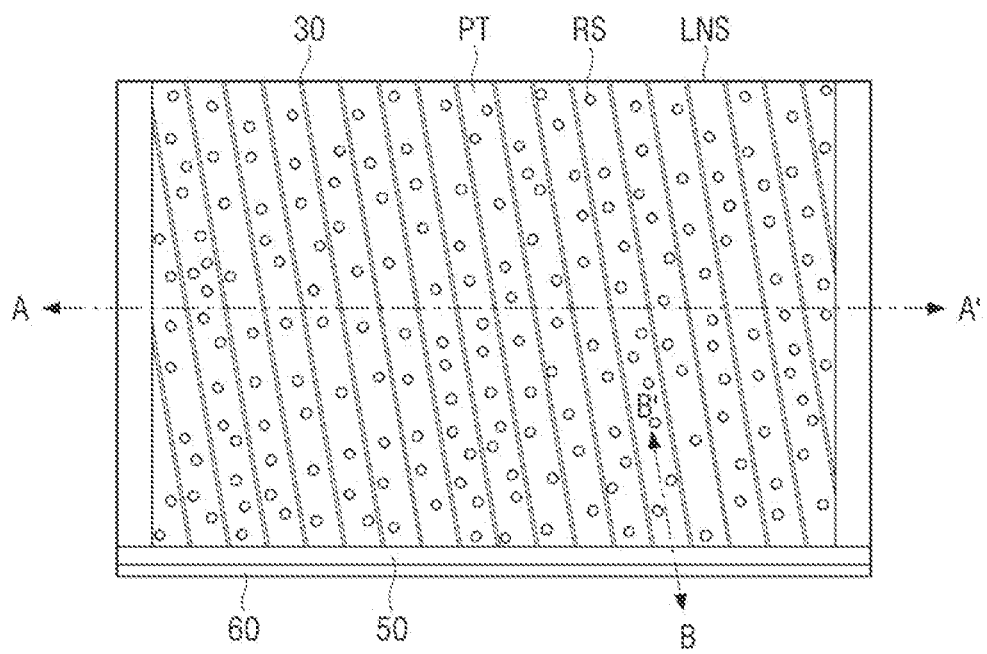
FIG. 5 is a plan view illustrating the display device in the first mode.
Figure 5:
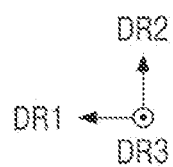
Figure 6:
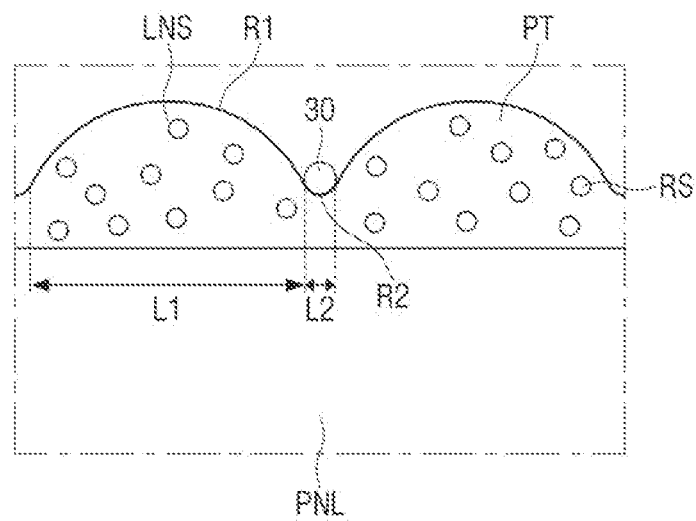
FIG. 6 is an enlarged cross-sectional view of the switchable lens layer in the first mode.
Figure 7:
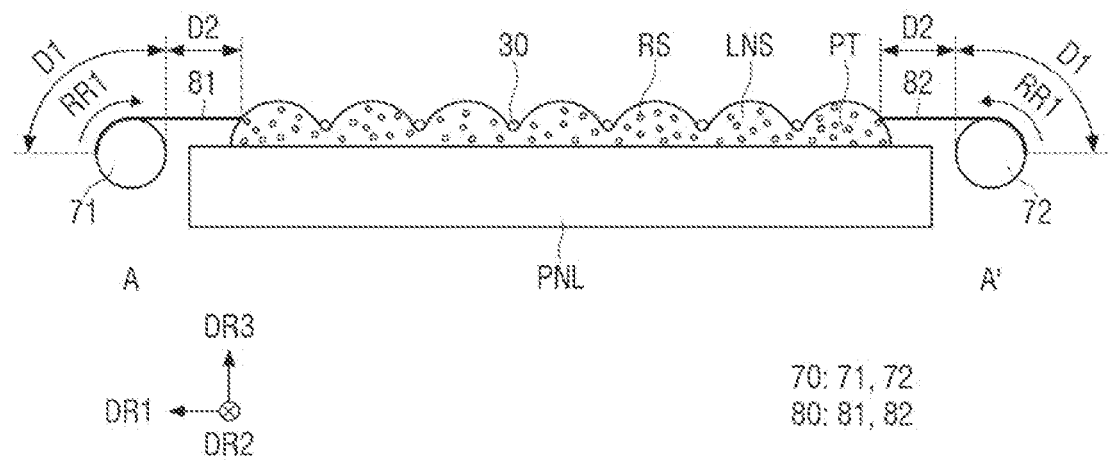
FIG. 7 is a cross-sectional view taken along line A-A' of FIG. 5.
Figure 8:
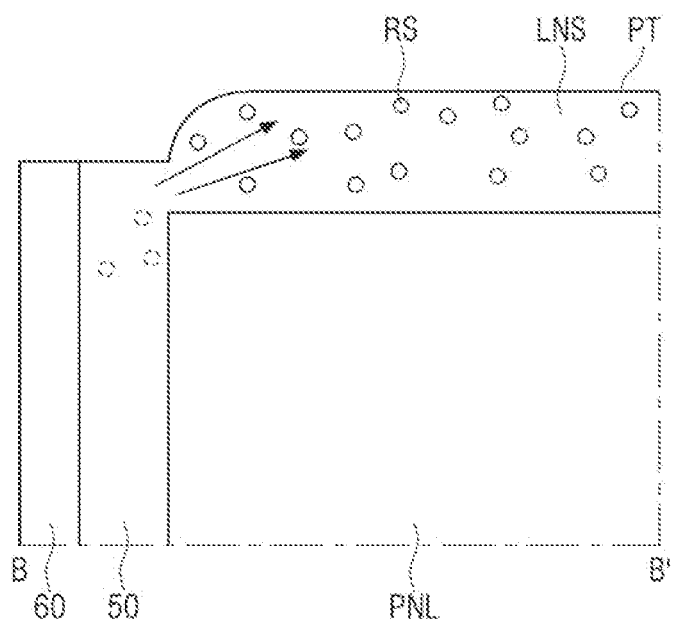
FIG. 8 is a cross-sectional view taken along line B-B' of FIG. 5.

FIG. 4 is a perspective view illustrating a switchable lens layer and a resin storage part in a first mode. FIG. 5 is a plan view illustrating the display device in the first mode. FIG. 6 is an enlarged cross-sectional view of the switchable lens layer in the first mode. FIG. 7 is a cross-sectional view taken along line A-A' of FIG. 5. FIG. 8 is a cross-sectional view taken along line B-B' of FIG. 5.

The switchable lens layer PT in the first mode will be described with reference to FIGS. 4 to 8.

Referring to FIGS. 4 to 6, the switchable lens layer PT may include the plurality of lenses LNS in the first mode. In addition, the respective lenses LNS of the switchable lens layer PT may have substantially the same shape and size as each other. In an embodiment of the present invention, a cross-sectional shape of the lens LNS may be a portion of a circle or an ellipse. When the cross-sectional shape of the lens LNS is a portion of the circle, it may be a semicircle or a sectoral shape having a central angle less than 180°. In an embodiment of the present invention, the lens LNS may have an overall lenticular lens shape. The cross-sectional shape of the lens LNS may be a triangle or other polygons. For example, the lens LNS may have an overall prism lens shape.

Each lens LNS may be formed to be convex in the third direction DR3. For example, each lens LNS may include a first portion L1, which is formed to be convex in the third direction DR3, and a second portion L2, which is formed to be concave in the third direction DR3. A peak (or, e.g., a top) of the lens LNS formed to be convex in the third direction DR3 may be formed at the first portion L1 of each lens LNS, and a lens valley formed to be concave in the third direction DR3 may be formed at the second portion L2 of each lens LNS.

A width of the first portion L1 of the lens LNS may be greater than a width of the second portion L2 of the lens LNS. For example, the width of the first portion L1 of the lens LNS may be the same as a width of the lens LNS having a convex shape, and the width of the second portion L2 of the lens LNS may be the same as a width of the lens LNS having a concave shape. For example, the width of the first portion L1 of the lens LNS may correspond to a width of the lens LNS having a convex shape, and the width of the second portion L2 of the lens LNS may correspond to a width of the lens LNS having a concave shape. Accordingly, the width of the lens LNS having the convex shape may be greater than the width of the lens LNS having the concave shape.

A thickness of the convex shape of the lens LNS formed at the first portion L1 is substantially determined according to the width of the first portion L1 and an amount of the resin RS filled in a first space A1. The thickness of the convex shape of the lens LNS formed at the first portion L1 may be the greatest at the center of the lens LNS and may decrease toward both edges of the lens LNS. In addition, a width of the convex shape of the lens LNS formed at the first portion L1 is substantially determined according to the width of the first portion L1.

A thickness of the concave shape of the lens LNS formed at the second portion L2 is substantially determined according to the width of the second portion L2. The thickness of the concave shape of the lens LNS formed at the second portion L2 may be the smallest at the center of the second portion L2 and may increase toward both edges of the second portion L2. In addition, a width of the concave shape of the lens LNS formed at the second portion L2 is substantially determined according to the width of the second portion L2.

One surface of the first portion L1 may have a first curvature R1. In an embodiment of the present invention, when one surface of the first portion L1 of the lens LNS is a portion of a circle, one surface of the first portion L1 may have the first curvature R1. For example, the peak of the lens LNS may have a shape of a portion of a circle having the first curvature R1. The first curvature R1 may be determined by the pitch of the fixing pins 30 in the first direction DR1. Since the switchable lens layer PT has the shape of the lens LNS between the fixing pins adjacent to each other, the first curvature R1 may be determined by the pitch of the fixing pins in the first direction and the resin RS filled in the first space A1. As the amount of filling of the resin RS in the first space A1 increases, a height of the lens LNS in the third direction may increase.

In addition, one surface of the second portion L2 may have a second curvature R2. For example, the second portion L2 of the lens LNS may have a shape of a portion of a circle having the second curvature R2. The second curvature R2 may be determined by a cross-sectional shape of the fixing pin 30. In an embodiment of the present invention, when the cross-sectional shape of the fixing pin 30 is a circle, the second curvature R2 may be the same as a curvature of the cross-sectional shape of the fixing pin 30. However, the present invention is not limited thereto, and the second curvature R2 may greater than the curvature of the cross-sectional shape of the fixing pin 30. In addition, the second curvature R2 may be smaller than the first curvature R1.

Each lens LNS may extend in one direction. For example, the lens LNS may be formed in a line shape in plan view. For example, as illustrated in FIGS. 6 and 7, each lens LNS may extend in a direction inclined at a predetermined angle with respect to the second direction DR2. The predetermined angle may be, for example, an acute angle with respect to the second direction DR2. The plurality of lenses LNS may be arranged in a direction crossing an extension direction of each lens LNS.

The fixing pin 30 may be disposed between the lenses LNS neighboring to each other among the plurality of lenses LNS in the first mode. For example, the fixing pins 30 may be disposed on the second portions L2 of the plurality of lenses LNS. For example, the fixing pin may be in direct contact with a surface of the lens LNS. For example, the fixing pin 30 may be in contact with a concave portion of the lens LNS at the second portion L2. In addition, the fixing pin 30 may be disposed between adjacent lenses LNS to be in contact with the adjacent lenses LNS at the same time. Accordingly, the fixing pins 30 may serve to allow the switchable lens layer PT to have a convex lens shape at the first portion L1 and have a concave lens shape at the second portion L2.

The respective fixing pins 30 may have substantially the same shape and size as each other. In an embodiment of the present invention, the cross-sectional shape of the fixing pin 30 may be a circle or an ellipse. It has been illustrated in the drawings that the cross-sectional shape of the fixing pin 30 is the circle, but the present invention is not limited thereto, and the cross-sectional shape of the fixing pin 30 may be a triangle or other polygons.

One surface of the fixing pin 30 may have a shape complementary to that of one surface of the lens LNS with which it is in contact. For example, one surface of the fixing pin and one surface of the lens LNS have complementary shapes, and thus, one surface of the fixing pin 30 and one surface of the lens LNS may be in contact with each other at the second portion L2. One surface of the fixing pin 30 having the shape complementary to that of one surface of the lens LNS may be rounded. For example, one surface of the lens LNS may receive the fixing pin 30 such that a convex shape is formed at the second portion L2. However, the present invention is not limited thereto, and the fixing pin 30 may be spaced apart from the lens LNS by a predetermined distance, or the fixing pin 30 and the lens LNS may be in contact with each other without having the complementary shapes.

The pitch of the fixing pins 30 may be the same as a pitch of the first portions L1. For example, between the fixing pins 30 adjacent to each other, the lens LNS may have a convex shape in the third direction DR3. Accordingly, the pitch of the first portions L1 where the lenses LNS have the convex shape may be the same as the pitch of the fixing pins 30. A width of the fixing pin 30 may be the same as a pitch of the second portions L2. For example, the lens LNS may have a concave shape in the third direction DR3 in an area thereof that overlaps each of the fixing pins 30. Accordingly, the pitch of the second portions L2 where the lenses LNS have the concave shape may be the same as the pitch of the fixing pins 30.

The fixing pin 30 may be made of a transparent material. For example, the fixing pin may be a photo-curable resin or a thermosetting resin. However, the present invention is not limited thereto, and when the fixing pin 30 does not overlap an emission area, the fixing pin 30 may also include an opaque material.

The fixing pin 30 may extend in one direction. For example, the fixing pin 30 may be formed in a line shape in plan view. For example, as illustrated in FIGS. 6 and 7, each fixing pin 30 may extend in a direction inclined at a predetermined angle with respect to the second direction DR2. A plurality of fixing pins 30 are arranged in a direction crossing an extension direction of each fixing pin 30. For example, the plurality of fixing pins 30 may be arranged along a direction inclined at a predetermined angle with respect to the first direction DIU. In an embodiment of the present invention, the plurality of fixing pins 30 may be arranged along the first direction DR1. Accordingly, the fixing pins 30 may be disposed in parallel with the plurality of lenses LNS.

Referring further to FIG. 7, the first winding part 71 may roll in the first rotation direction RR1 in the first mode. For example, when the first winding part 71 rolls in the first rotation direction RR1 in the first mode, the first connection part 81, which is connected to the first winding part 71, may be unwound from the rolling part 70. Accordingly, when the first winding part 71 rolls in the first rotation direction RR1, a first length D1 of the first connection part 81 that is winded around the rolling part 70 may decrease, and a second length D2 of the first connection part 81 that is not winded around the rolling part 70 may increase. Accordingly, a length of one surface of the switchable lens layer PT connected to the first connection part 81 may increase or one surface of the switchable lens layer PT may be loosened.

Accordingly, the first winding part 71 may adjust the switchable lens layer PT so that the switchable lens layer PT has the shape of the lens LNS. For example, when the first length D1 of the first connection part 81 decreases and the second length D2 of the first connection part 81 increases in the first mode, a length of the other surface of the switchable lens layer PT may increase as compared with a length of one surface of the switchable lens layer PT overlapping the display panel PNL. Accordingly, the switchable lens layer PT is filled with the resin RS, such that the switchable lens layer PT may have the shape of the lens LNS.

The second winding part 72 may roll in the first rotation direction RR1 in the first mode. The second winding part 72 and the second connection part 82 are substantially the same as the first winding part 71 and the first connection part 81, respectively, and a description thereof will thus be omitted.

Referring further to FIG. 8, the plurality of lenses LNS may be filled with the resin RS. For example, the magnetic field generation part 60 might not generate the magnetic field in the first mode. Accordingly, the resin RS may move from a third space A3 of the resin supply part to the first space A1 of the switchable lens layer PT. Accordingly, when the magnetic field is not generated, the resin RS may be filled in the first space A1 of the switchable lens layer PT, and the switchable lens layer PT may be formed to be convex in the third direction DR3. For example, the resin RS is disposed inside the switchable lens layer PT, such that the switchable lens layer PT may have the shape of the lens LNS.

The resin RS may include a transparent resin. The resin RST may include a photocurable resin such as an epoxy acrylate-based resin, a urethane acrylate-based resin, or a silicone acrylate-based resin, an acrylic resin, a urethane-based resin, a polyester-based resin, or the like. In addition, the resin RS may include a material that rolls or moves according to the magnetic field. The resin RS may include zirconium oxide ($ZrO_2$) or iron oxide ($Fe_3O_4$) combined with the transparent resin. When the resin RS includes zirconium oxide or iron oxide, the resin RS may move according to the magnetic field.

In summary, the rolling part 70 rolls in the first rotation direction RR1 in the first mode, such that the connection part 80 winded around the rolling part 70 may be loosened or unwound. Accordingly, the second length of the connection part 80 may increase, and an upper surface of the switchable lens layer PT may be loosened. In addition, the magnetic field generation part does not generate the magnetic field in the first mode, such that the resin RS may move from the resin supply part 50 to the first space A1 of the switchable lens layer PT. Accordingly, the upper surface of the switchable lens layer PT may have a convex shape in the third direction DR3 between the pitches of the fixing pins 30 in the first direction DR1. For example, the upper surface of the switchable lens layer PT may have the shape of the plurality of lenses LNS in the first mode.

Figure 9:
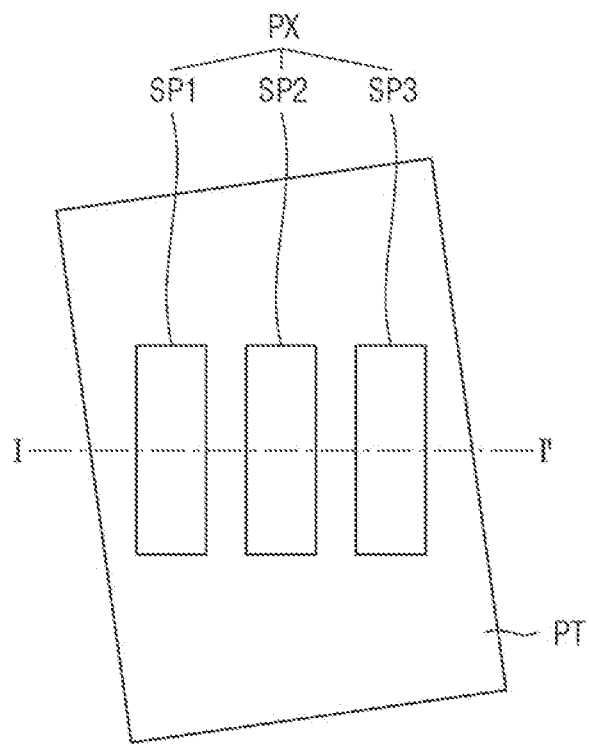
FIG. 9 is an enlarged plan view of a pixel portion of FIG. 5.
Figure 10:
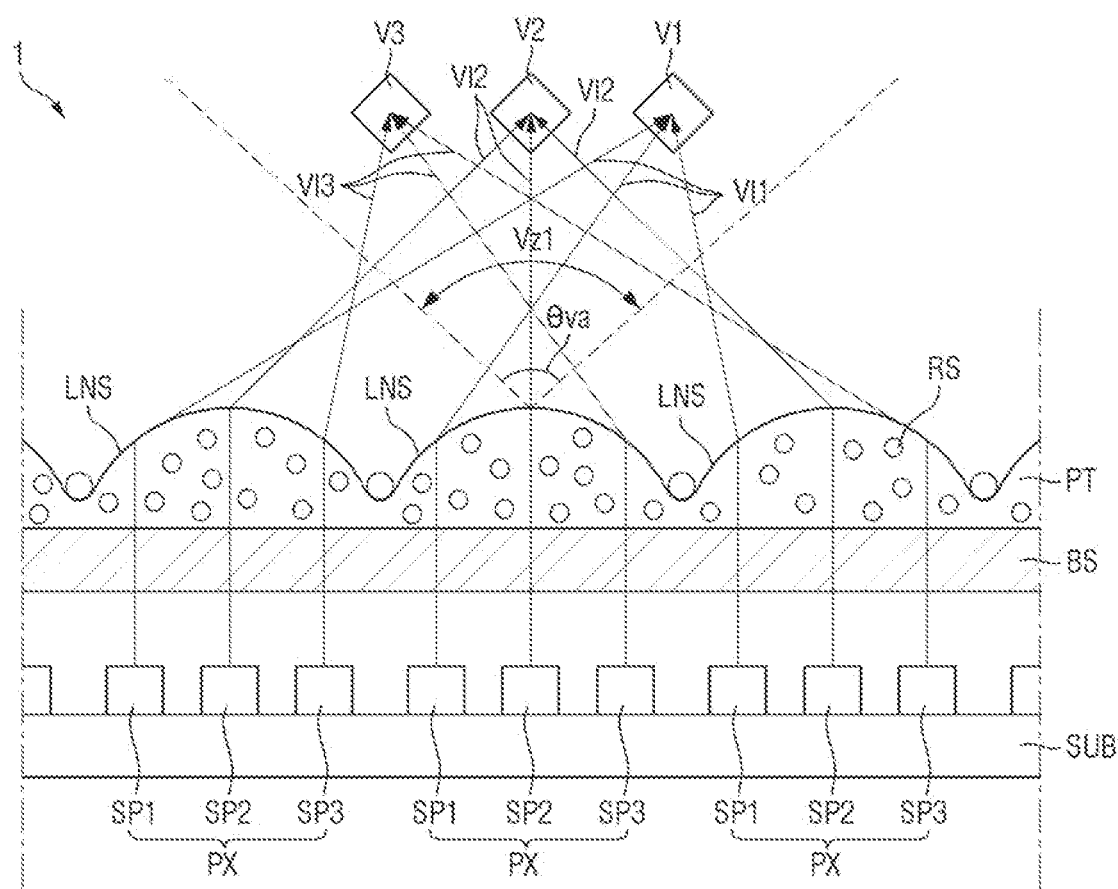
FIG. 10 is an enlarged cross-sectional view of the pixel portion of FIG. 5.
Figure 10:
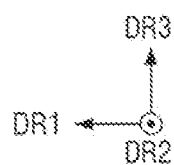

FIG. 9 is an enlarged plan view of a pixel portion of FIG. 5. FIG. 10 is an enlarged cross-sectional view of the pixel portion of FIG. 5.

FIG. 9 conceptually illustrates an arrangement of the switchable lens layer PT and the plurality of pixels PX, and FIG. 10 conceptually illustrates a method of implementing a stereoscopic image and viewing angle control of the display device 1. For convenience of explanation, only one pixel PX and one lens LNS of the display panel PNL are illustrated in FIG. 9 and only three pixels PX and three lenses LNS of the display panel PNL are illustrated in FIG. 10, but the numbers of pixels PX and lenses LNS are not limited thereto.

Referring to FIGS. 9 and 10, the display panel PNL may further include a substrate SUB.

The substrate SUB may include an organic polymer material such as polyethylene, polyimide, polycarbonate, polysulfone, polyacrylate, polystyrene, polyvinylchloride, polyvinylalcohol, polynorbornene, or polyester. The display panel PNL may further include another substrate SUB disposed between a base member 210 and the plurality of pixels PX.

The plurality of pixels PX may be disposed on the substrate SUB. For example, the plurality of pixels PX may be disposed on an upper surface of the substrate SUB. Each of the plurality of pixels PX may include a plurality of sub-pixels SP.

The pixel PX may include a group of sub-pixels SP for expressing a white gradation. Each of the sub-pixels SP may be defined as a minimum unit capable of expressing a gradation.

As illustrated in FIGS. 9 and 10, in plan view, three sub-pixels SP may be disposed to overlap one lens LNS in the thickness direction, but the present invention is not limited thereto. The number of sub-pixels SP overlapping one lens LNS may be variously changed. For example, the number of sub-pixels SP overlapping one lens LNS may be changed based on the desired number of view areas V1, V2, and V3. In addition, it has been illustrated in FIG. 10 that the plurality of sub-pixels SP do not overlap boundaries of the switchable lens layer PT in plan view, but sub-pixels SP adjacent to the boundaries of the switchable lens layer PT may also overlap the boundaries of the switchable lens layer PT in plan view.

The plurality of pixels PX may include first sub-pixels SP1, second sub-pixels SP2, and third sub-pixels SP3.

The first sub-pixels SP1 may emit light of a first color. The second sub-pixels SP2 may emit light of a second color, and the third sub-pixels SP3 may emit light of a third color. For example, the first color may be red. The second color may be green, and the third color may be blue. However, the present invention is not limited thereto.

For example, each of the first sub-pixels SP1, the second sub-pixels SP2, and the third sub-pixels SP3 may have a rectangular shape, in plan view. For example, the rectangular shape may include short sides in the first direction DR1 and long sides in the second direction DR2. However, the present invention is not limited thereto, and each of the first sub-pixels SP1, the second sub-pixels SP2, and the third sub-pixels SP3 may have various shapes such as a square shape, a rhombic shape, a circular shape, and an elliptical shape in plan view.

The first sub-pixels SP1, the second sub-pixels SP2, and the third sub-pixels SP3 may be arranged in the first direction DR1 in plan view. The first sub-pixels SP1, the second sub-pixels SP2, and the third sub-pixels SP3 may be repeatedly arranged in the order of the first sub-pixels SP1, the second sub-pixels SP2 and the third sub-pixels SP3, but the present invention is not limited thereto.

As illustrated in FIG. 10, the first sub-pixels SP1, the second sub-pixels SP2, and the third sub-pixels SP3 may be arranged in a direction inclined with respect to a direction in which the switchable lens layer PT extends and/or the boundaries of the switchable lens layer PT. For example, from a plan view, the first sub-pixels SP1, the second sub-pixels SP2, and the third sub-pixels SP3 may be arranged in a direction inclined with respect to a side of the switchable lens layer PT. However, the present invention is not limited thereto, and the first sub-pixels SP1, the second sub-pixels SP2, and the third sub-pixels SP3 may be arranged in a direction orthogonal or parallel to a direction in which the switchable lens layer PT extends and/or the boundaries of the switchable lens layer PT.

Referring to FIG. 10, the first sub-pixels SP1, the second sub-pixels SP2, and the third sub-pixels SP3 may provide first view images VI1, second view images VI2, and third view images VI3. The first view images VI1, the second view images VI2, and the third view images VI3 may constitute at least a portion of a light field image to be described later. In addition, the first view images VI1, the second view images VI2, and the third view images VI3 may be images generated in consideration of binocular parallax.

The first view images VI1 displayed by the first sub-pixels SP1, the second view images VI2 displayed by the second sub-pixels SP2, and the third view images VI3 displayed by the third sub-pixels SP3 may be displayed in separate spaces from each other on the front surface of the display device 1. The first view images VI1, the second view images VI2, and the third view images VI3 may be refracted by the lenses LNS and may be provided to a first view area V1, a second view area V2, and a third view area V3 of the display device 1, respectively. The view areas may be viewpoints provided by the display device 1. For example, the second view area V2 may be positioned in a center area of the display device 1. For example, the first view area V1 may be positioned in a right area of the display device 1, and the third view area V3 may be positioned in a left area of the display device 1.

When a user's left eye and right eye are positioned in different view areas of the first view area V1 to an N-th view area VN, a user may realize a three-dimensional effect according to the binocular parallax. In this case, one image includes an object viewing angle at which the user may feel a three-dimensional effect. The object viewing angle refers to a maximum angle at which an object naturally has a three-dimensional effect in one object of an image. For example, an axis in a direction in which an image of the display panel is displayed may be defined as a reference axis, and a maximum angle at which an object may be three-dimensionally displayed from the reference axis may be defined as the object viewing angle. Accordingly, the user may realize the three-dimensional effect of the image within the object viewing angle.

In addition, for convenience of explanation, it has been illustrated in FIG. 10 that three view images VI1, VI2, and VI3 are provided to three view areas V1, V2, and V3 by the first sub-pixels SP1, the second sub-pixels SP2, and the third sub-pixels SP3, respectively, but the present invention is not limited thereto. The display device 1 may further include a plurality of sub-pixels SP1, SP2, and SP3 providing additional view images, viewpoints, and/or viewing zones in addition to the view images VI1, VI2, and VI3, the view areas V1, V2, and V3, and display viewing angles Vz1. For example, the numbers of sub-pixels SP1, SP2, and SP3, view images VI1, VI3, and VI3, view areas V1, V2, and V3, and display viewing angles Vz1 may be variously changed.

In the embodiment, the switchable lens layer PT has the shape of the lens in the first mode, and thus, the display device 1 may provide a stereoscopic image.

Figure 11:
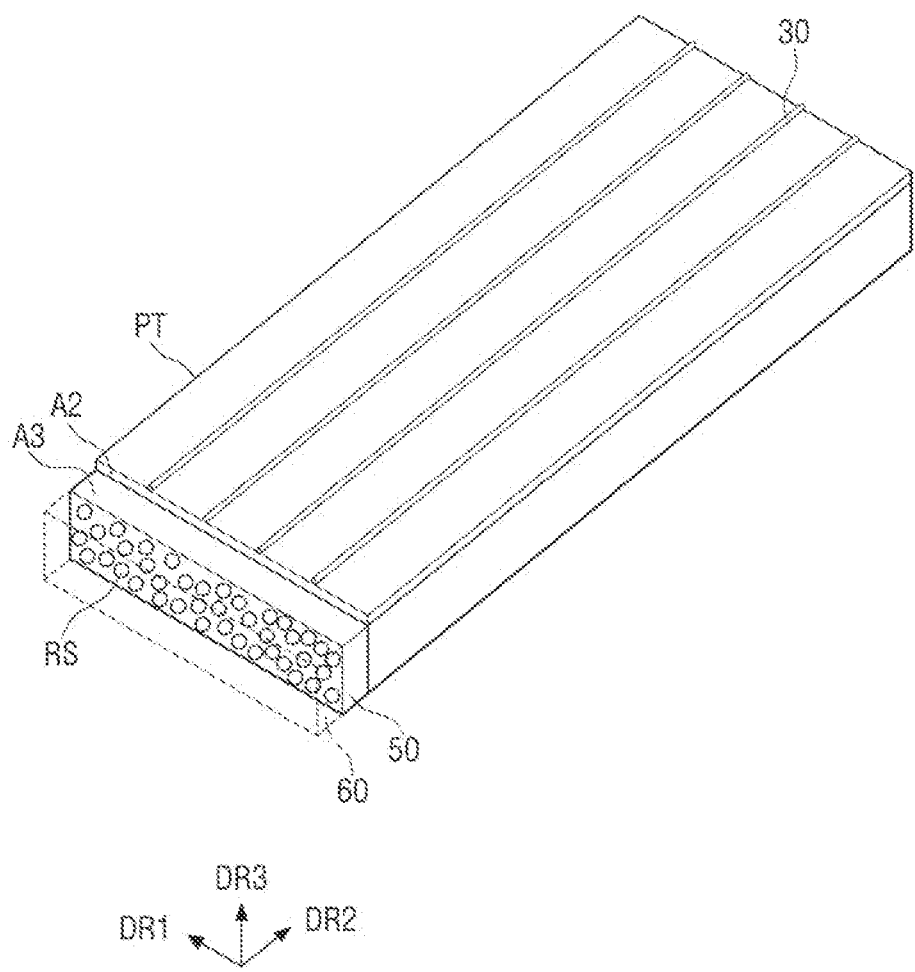
FIG. 11 is a perspective view illustrating the switchable lens layer and the resin storage part in a second mode.
Figure 12:
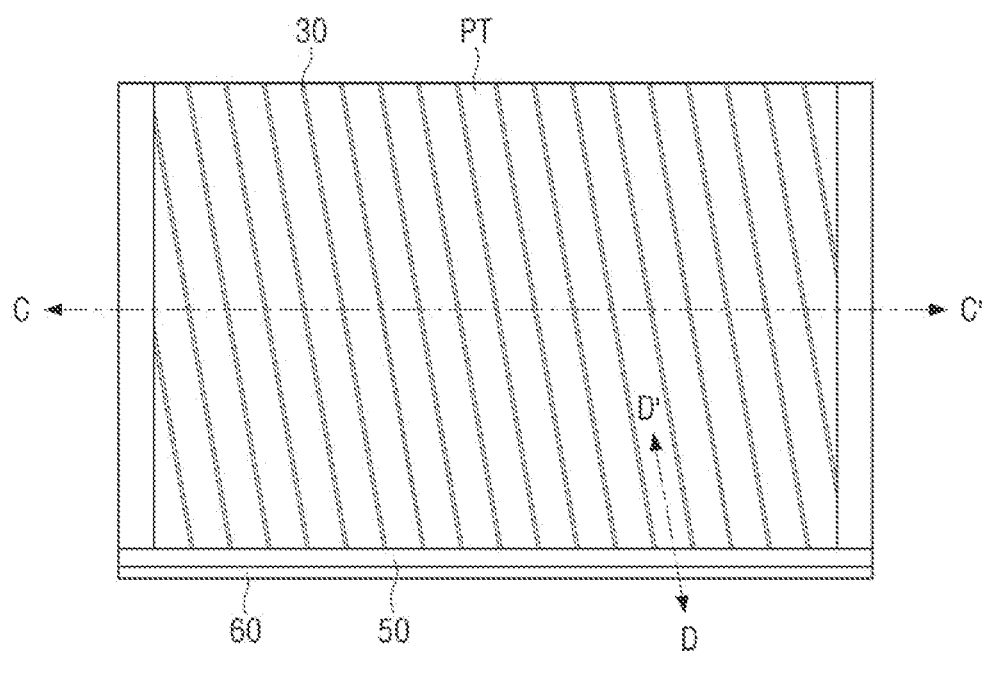
FIG. 12 is a plan view illustrating the display device in the second mode.
Figure 13:
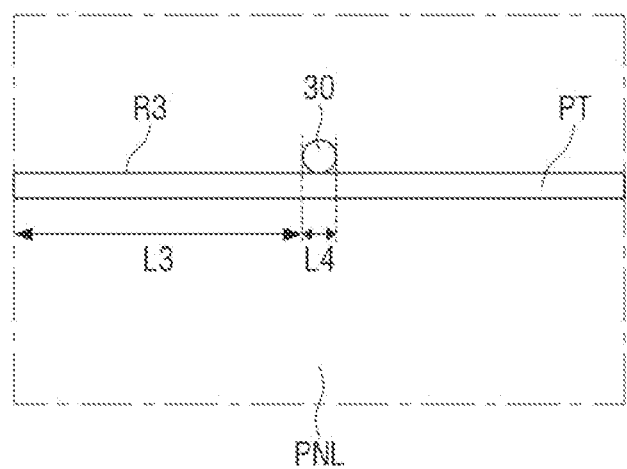
FIG. 13 is an enlarged cross-sectional view of the switchable lens layer in the second mode.
Figure 14:
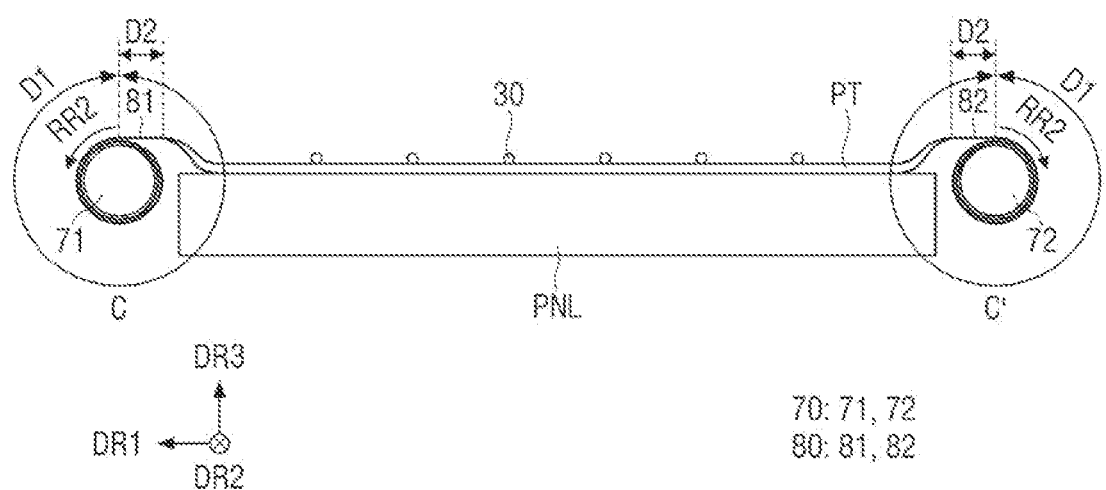
FIG. 14 is a cross-sectional view taken along line C-C' of FIG. 12.
Figure 15:
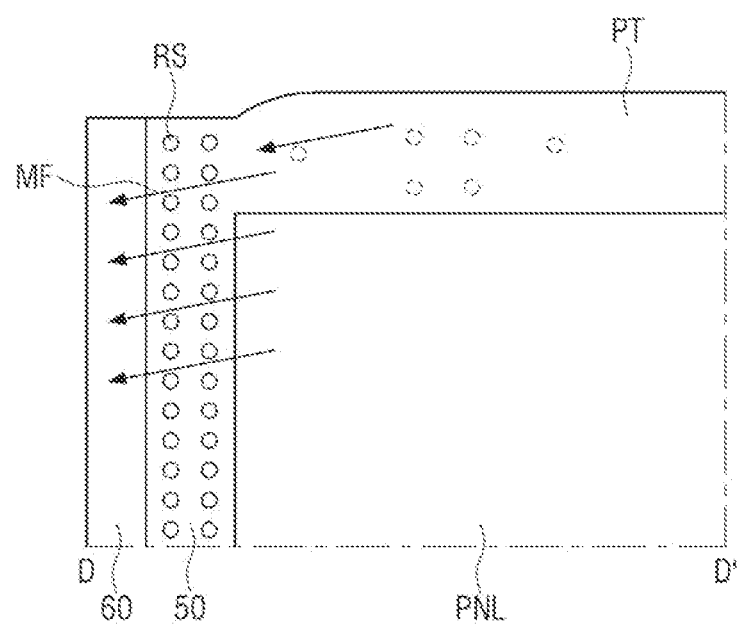
FIG. 15 is a cross-sectional view taken along line D-D' of FIG. 12.
Figure 16:
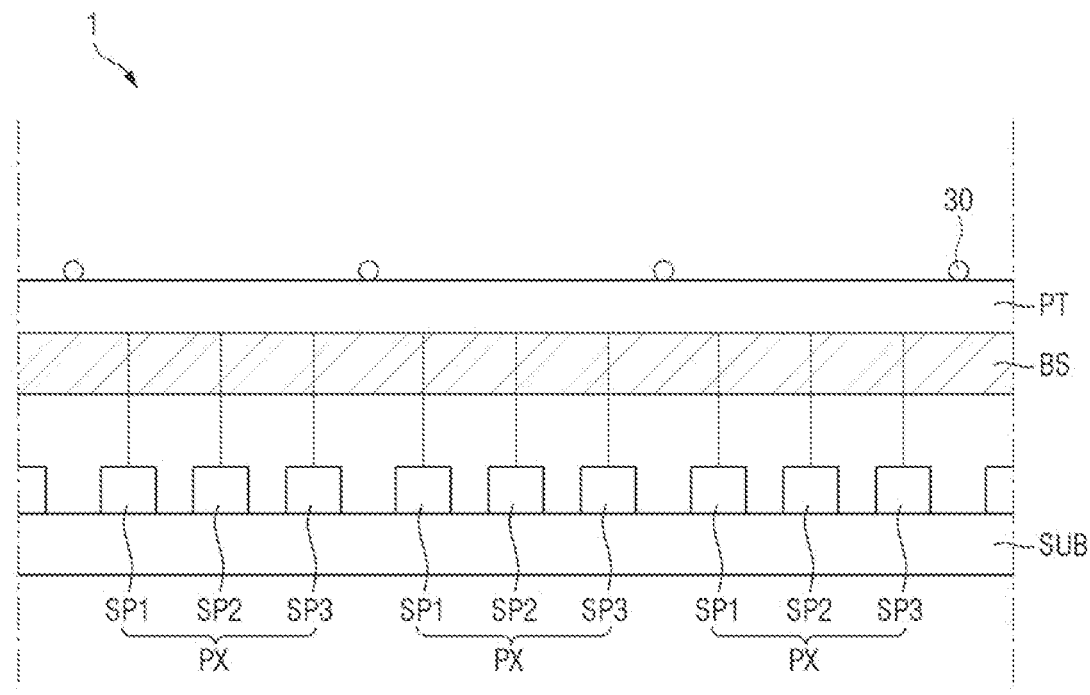
FIG. 16 is an enlarged cross-sectional view of a pixel portion of FIG. 12.

FIG. 11 is a perspective view illustrating the switchable lens layer and the resin storage part in a second mode. FIG. 12 is a plan view illustrating the display device in the second mode. FIG. 13 is an enlarged cross-sectional view of the switchable lens layer in the second mode. FIG. 14 is a cross-sectional view taken along line C-C' of FIG. 12. FIG. 15 is a cross-sectional view taken along line D-D' of FIG. 12. FIG. 16 is an enlarged cross-sectional view of a pixel portion of a display panel. The switchable lens layer PT in the second mode will be described with reference to FIGS. 11 to 16.

Referring to FIGS. 11 to 13, one surface of the switchable lens layer PT may have the flat shape in the second mode. In an embodiment of the present invention, a cross-sectional shape of the switchable lens layer PT may be a quadrangle. For example, one surfaces of a third portion L3 of the switchable lens layer PT and a fourth portion L4 of the switchable lens layer PT may have a flat shape. However, the present invention is not limited thereto, and the third portion L3 of the switchable lens layer PT may have a fine convex shape and/or the fourth portion L4 of the switchable lens layer PT may have a fine concave shape.

A width of the third portion L3 of the switchable lens layer PT may be greater than a width of the fourth portion L4 of the switchable lens layer PT. For example, the width of the third portion L3 of the switchable lens layer PT may be the same as the width of the first portion L1 of the lens LNS, and the width of the fourth portion L4 of the switchable lens layer PT may be the same as the width of the second portion L2 of the lens LNS.

Thicknesses of the third portion L3 of the switchable lens layer PT and the fourth portion L4 of the switchable lens layer PT are substantially determined according to a distance between the display panel PNL and the fixing pin 30. For example, the thicknesses of the third portion L3 of the switchable lens layer PT and the fourth portion L4 of the switchable lens layer PT may be the same as each other. However, the present invention is not limited thereto, and the thickness of the third portion L3 of the switchable lens layer PT may be the greatest at the center of the third portion L3, and may slightly decrease toward both edges of the third portion L3.

One of a surface of the third portion of the switchable lens layer PT and/or a surface of the fourth portion L4 of the switchable lens layer PT may have a third curvature R3. In an embodiment of the present invention, when one of the surface of the third portion L3 of the switchable lens layer PT and/or the surface of the fourth portion L4 of the switchable lens layer PT is flat, the third curvature R3 may be infinity. However, the present invention is not limited thereto, and when one of the surface of the third portion L3 of the switchable lens layer PT and/or the surface of the fourth portion L4 of the switchable lens layer PT have a rounded shape (e.g., a shape of a portion of a circle), the third curvature R3 may have a very great value.

Referring further to FIG. 14, the first winding part 71 may roll in the second rotation direction RR2 in the second mode. For example, when the first winding part 71 rolls in the second rotation direction RR2 in the second mode, the first connection part 81 connected to the first winding part 71 may be winded to the rolling part 70. Accordingly, when the first winding part 71 rolls in the second rotation direction RR2, a first length D1 of the first connection part 81 that is winded around the rolling part 70 may increase, and a second length D2 of the first connection part 81 that is not winded around the rolling part 70 may decrease. Accordingly, one surface of the switchable lens layer PT connected to the first connection part 81 may be tightened.

Accordingly, the first winding part 71 may adjust the switchable lens layer PT so that one surface of the switchable lens layer PT has the flat shape. For example, when the first length D1 of the first connection part 81 increases and the second length D2 of the first connection part 81 decreases in the second mode, a length of one surface of the switchable lens layer PT overlapping the display panel PNL and a length of the other surface of the switchable lens layer PT may be the same as each other.

A length of the upper surface of the switchable lens layer PT overlapping the display panel PNL in the second mode may be smaller than the length of one surface of the switchable lens layer overlapping the display panel PNL in the first mode. For example, one surface of the switchable lens layer PT has the flat shape in the second mode, and a surface of the switchable lens layer PT has a curved shape in the first mode. Therefore, in a cross-sectional view, an entire length of the curved shape may be greater than an entire length of the flat shape.

The second winding part 72 may roll in the second rotation direction RR2 in the second mode. The second winding part 72 and the second connection part 82 are substantially the same as the first winding part 71 and the first connection part 81, respectively, and a description thereof will thus be omitted.

Referring further to FIG. 15 with reference to FIG. 11, the resin RS might not be filled in the switchable lens layer PT. For example, the magnetic field generation part 60 may generate a magnetic field MF in the second mode, and the resin RS may move according to a direction of the magnetic field MF. Accordingly, the resin RS may move from a second space A2 of the switchable lens layer PT to the third space A3 of the resin supply part 50. Accordingly, when the magnetic field MF is generated, the resin RS is not filled in the second space A2 of the switchable lens layer PT, and may move to the resin supply part 50. For example, one surface of the switchable lens layer PT may be formed to be flat. For example, the resin RS moves from an inner portion of the switchable lens layer PT to the resin supply part and thus, one surface of the switchable lens layer PT may have the flat shape.

The resin RS may include a material that rolls or moves according to the magnetic field. As described above, for example, when the resin RS includes zirconium oxide or iron oxide, the resin RS may move according to the magnetic field. Accordingly, in the second mode, when the magnetic field generation part 60 applies the magnetic field, the resin RS may move to the resin supply part 50 adjacent to the magnetic field generation part 60.

In summary, the rolling part 70 rolls in the second rotation direction RR2 in the second mode, such that the connection part 80 winded around the rolling part 70 may be tightened. Accordingly, the second length of the connection part 80 may decrease, and the upper surface of the switchable lens layer PT may be tightened. In addition, the magnetic field generation part generates the magnetic field in the second mode, such that the resin RS may move from the second space A2 of the switchable lens layer PT to the resin supply part 50. Accordingly, the upper surface of the switchable lens layer PT may be disposed between the fixing pins 30 and the display panel PNL. That is, the upper surface of the switchable lens layer PT may have a flat shape in the second mode.

FIG. 16 is substantially the same as an embodiment of FIG. 10 except for a shape of the switchable lens layer PT, and thus, redundant or repetitive descriptions may be omitted or briefly discussed.

Referring further to FIG. 16, the plurality of pixels PX may include first sub-pixels SP1, second sub-pixels SP2, and third sub-pixels SP3. In addition, the switchable lens layer PT may have a flat shape. Accordingly, in the embodiment, the switchable lens layer PT has the flat shape in the second mode, and thus, the display device 1 may provide a plane image.

Figure 17:
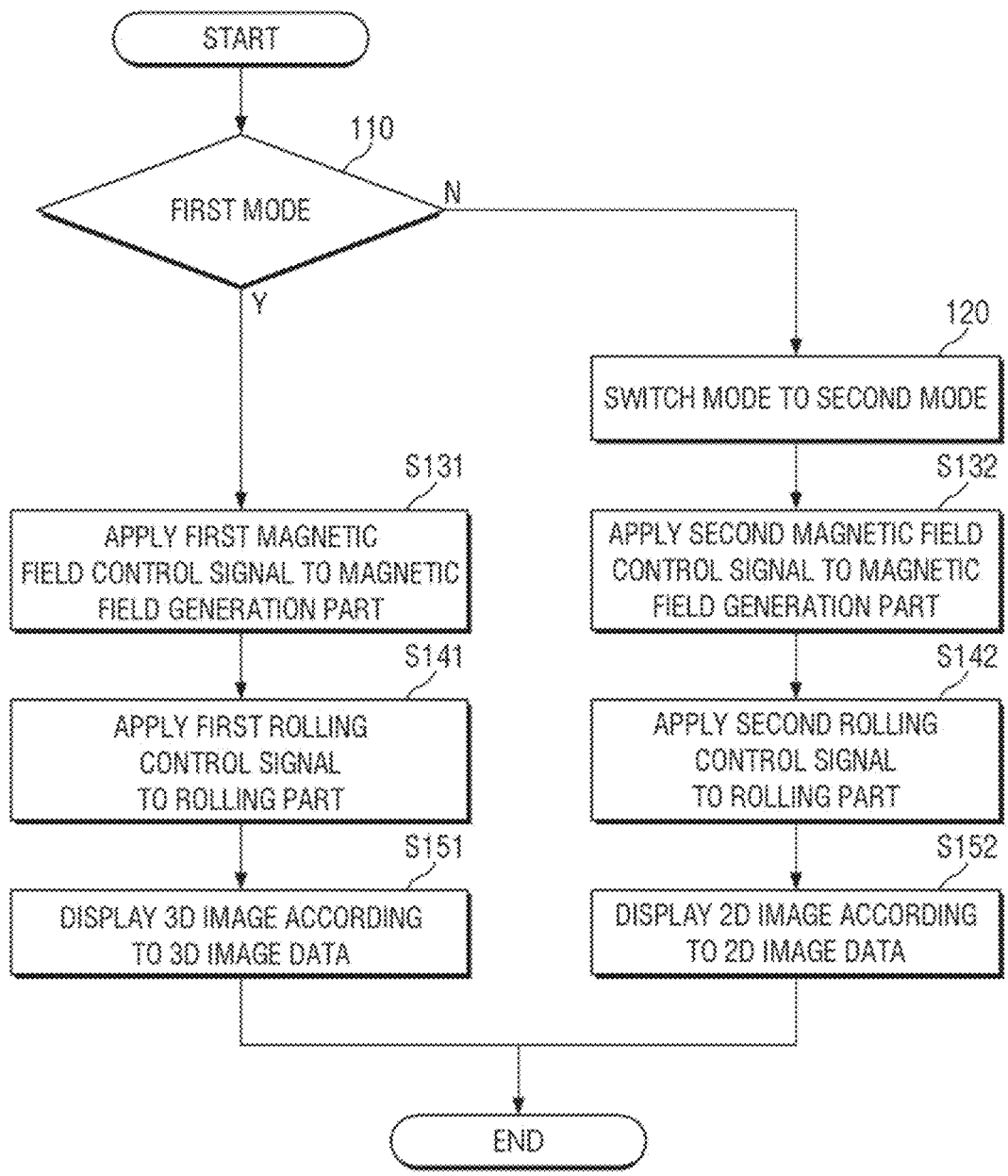
FIG. 17 is a flowchart illustrating an image display method of the display device according to an embodiment of the present invention.

FIG. 17 is a flowchart illustrating an image display method of the display device according to an embodiment of the present invention.

Referring to FIG. 17, first, the display device 1 determines whether or not to switch a mode to the first mode (S110). When the mode is switched to the first mode (S110: Y), the controller 300 applies the first magnetic field control signal MCS1 to the magnetic field generation part 60 (S131).

The magnetic field generation part 60 might not generate the magnetic field in response to receiving the first magnetic field control signal MCS1 in the first mode. Accordingly, the resin RS may move from the resin supply part 50 to the switchable lens layer PT.

Next, the controller 300 applies the first rolling control signal RCS1 to the rolling part (S141). The rolling part 70 may be driven so that the switchable lens layer PT (or the connection part connected to the switchable lens layer PT) is unwound by receiving the first rolling control signal RCS1 in the first mode. Accordingly, the switchable lens layer PT may have the shape of the lens.

Finally, the display device 1 may display a 3D image according to 3D image data (S151). The controller 300 may output the 3D image to the display panel PNL in the first mode. Accordingly, the display device 1 may provide a stereoscopic image while an image output from the display panel PNL is transmitted through the switchable lens layer PT.

In addition, when the mode is not switched to the first mode (S110: N), the mode may be switched to the second mode (S120).

Next, the controller 300 applies the second magnetic field control signal MCS2 to the magnetic field generation part 60 (S132). The magnetic field generation part 60 may generate the magnetic field in response to receiving the second magnetic field signal MCS2 in the second mode. Accordingly, the resin RS may move from the switchable lens layer PT to the resin supply part 50.

Next, the controller 300 applies the second rolling control signal RCS2 to the rolling part 70 (S142). The rolling part 70 may be driven so that the switchable lens layer PT (or the connection part connected to the switchable lens layer PT) is winded in the second mode. Accordingly, one surface of the switchable lens layer PT may have the flat shape.

Finally, the display device 1 array display a 2D image according to 2D image data (S152). The controller 300 may output the 2D image to the display panel PNL in the second mode. Accordingly, the display device 1 may provide the 2D image while an image output from the display panel PNL is transmitted through the switchable lens layer PT having the flat shape.

Figure 18:
FIGS. 18, 19 and 20 are cross-sectional views illustrating a method of manufacturing the display device according to an embodiment of the present invention.
Figure 19:
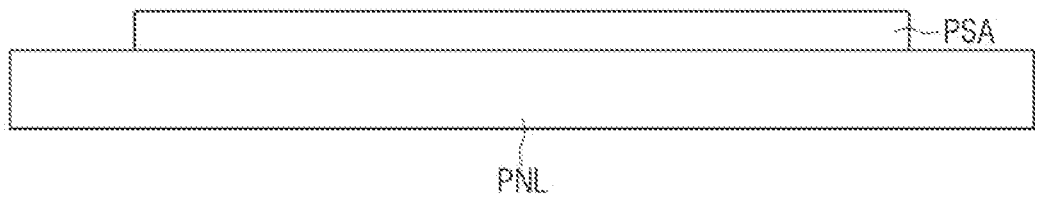
Figure 20:
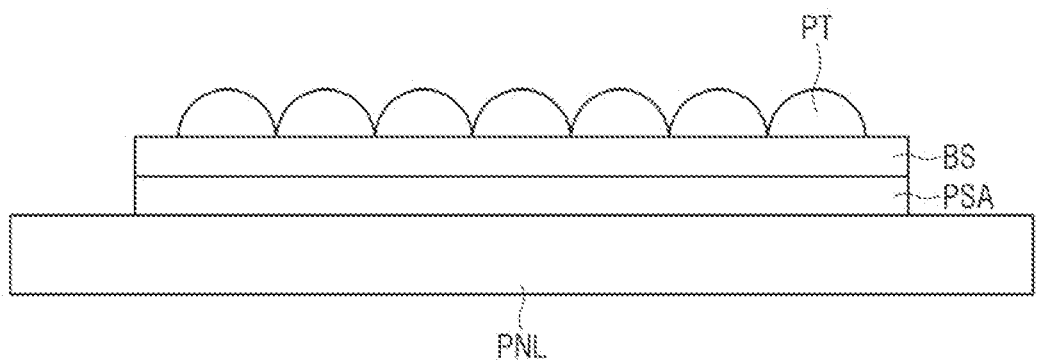

FIGS. 18 to 20 are cross-sectional views illustrating a method of manufacturing the display device according to an embodiment of the present invention.

First, referring to FIG. 18, the display panel PNL is prepared.

Next, referring to FIG. 19, the coupling member PSA is attached onto one surface of the display panel PNL. The coupling member PSA may have a size smaller than or equal to that of the display panel PNL. In addition, the coupling member PSA may have a size equal to or greater than the display area of the display panel PNL.

Finally, referring to FIG. 20, the lens array SWL is attached onto the coupling member PSA. The lens array SWL may be attached onto one surface of the display panel PNL through the coupling member PSA. The lens array SWL and the coupling member PSA may have the same shape in plan view. The coupling member PSA may have a size smaller than or equal to that of the lens array SWL. The coupling member PSA might not protrude to the outside of or beyond the lens array SWL, but present invention is not limited thereto.

Accordingly, the display device 1 including the switchable lens layer PT capable of providing the stereoscopic image or the plane image may be provided.

Figure 21:
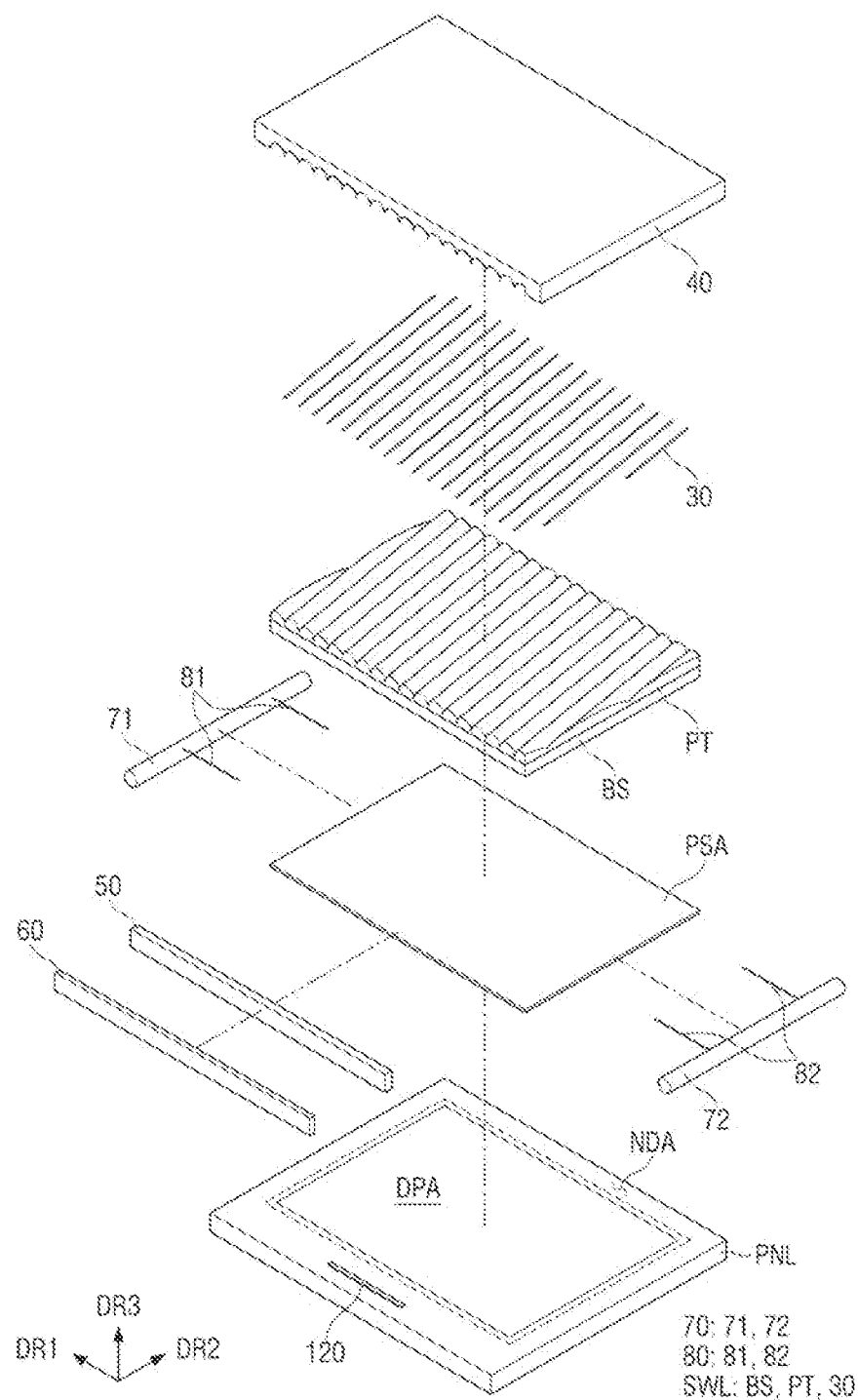
FIG. 21 is an exploded perspective view illustrating a display device according to an embodiment of the present invention.

FIG. 21 is an exploded perspective view illustrating a display device according to an embodiment of the present invention.

An embodiment of the present invention, with reference to FIG. 21 is substantially the same as an embodiment of the present invention with reference to FIGS. 1 to 16 except that a cover window 40 is disposed on the lens array SWL, and thus, redundant or repetitive descriptions may be omitted or briefly discussed.

Referring to FIG. 21, the cover window 40 may be disposed on the lens array SWL. The cover window 40 may be attached onto one surfaces of the lens array SWL and the fixing pins 30. The cover window 40 and the display panel PNL may have the same shape in plan view. The cover window 40 may be disposed to cover the lens array SWL.

The cover window 40 may include a shape complementary to the shape of the lens LNS. For example, in the first mode, the switchable lens layer PT may have the shape of the lens LNS, and one surface of the cover window 40 may have a shape complementary to the shape of the lens LNS. For example, the cover window 40 may be in contact with the switchable lens layer PT in the first mode. In addition, the cover window 40 may further include a space between the switchable lens layer PT and the cover window 40 in the second mode. The cover window 40 may be made of a transparent material. For example, the cover window 40 may include a plurality of grooves that correspond to the shape of the plurality of lens LNS of the switchable lens layer PT.

Also in the embodiment, when the switchable lens layer PT has the shape of the lens LNS, the display device 1 may provide a stereoscopic image. In addition, when the switchable lens layer PT has the flat shape, the display device 1 may provide a plane image (e.g., a planar image).

Figure 22:
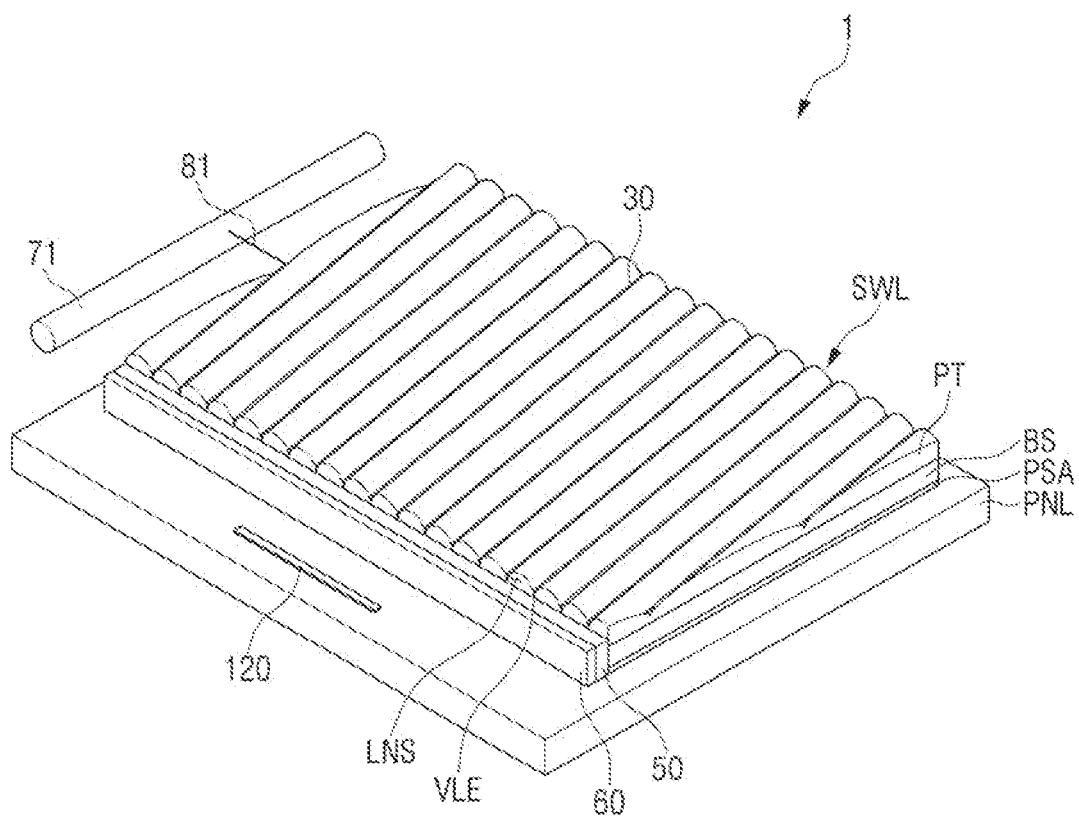
FIG. 22 is a perspective view illustrating a display device according to an embodiment of the present invention.

FIG. 22 is a perspective view illustrating a display device according to an embodiment of the present invention.

An embodiment of the present invention with reference to FIG. 22 is substantially the same as an embodiment of the present invention with reference to FIGS. 1 to 16 except that a winding part 71 is disposed on only one side surface of the lens array SWL and thus, redundant or repetitive descriptions may be omitted or briefly discussed.

Referring to FIG. 22, the winding part 71 may be disposed on a side surface of the switchable lens layer PT. For example, the winding part 71 may be disposed on one side surface of the switchable lens layer PT in the first direction DR1. In addition, the winding part 71 may be connected to the switchable lens layer PT. The winding part 71 may adjust the switchable lens layer PT so that the switchable lens layer PT has the shape of the plurality of lenses LNS. The winding part 71 may adjust the switchable lens layer PT so that the switchable lens layer PT has the shape of the plurality of lenses INS in the first mode, and adjust the switchable lens layer PT so that the upper surface of the switchable lens layer PT has the flat shape in the second mode.

Figure 23:
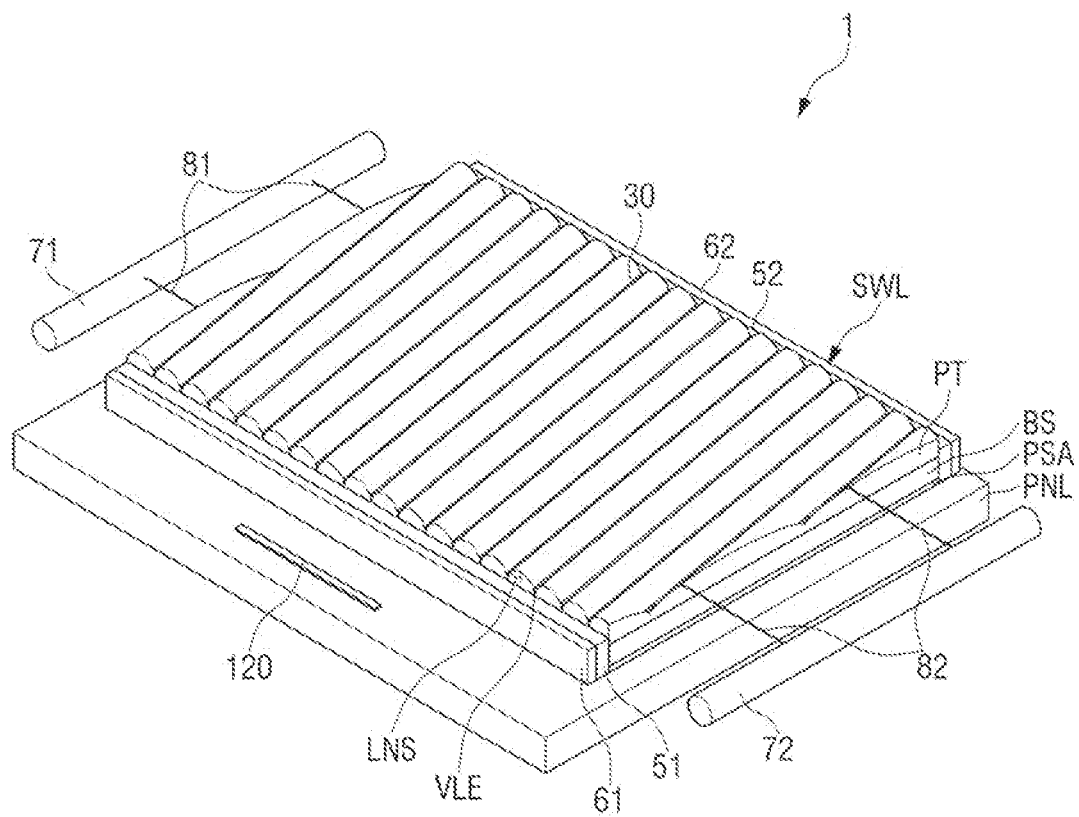
FIG. 23 is a perspective view illustrating a display device according to an embodiment of the present invention.

FIG. 23 is a perspective view illustrating a display device according to an embodiment of the present invention.

An embodiment of the present invention with reference to FIG. 23 is substantially the same as an embodiment of the present invention with reference to FIGS. 1 to 16 except that a plurality of resin supply parts and magnetic field generation parts are disposed on both side surfaces of the lens array SWL, and thus, redundant or repetitive descriptions may be omitted or briefly discussed.

Referring to FIG. 23, a first resin supply part 51 may be disposed on one side surface of the switchable lens layer PT. For example, the first resin supply part 51 may be disposed on one side surface of the switchable lens layer PT in the second direction DR2. The first resin supply part 51 is substantially the same as the resin supply part of an embodiment of the present invention with reference to FIGS. 1 to 16, and thus, redundant or repetitive descriptions may be omitted or briefly discussed.

A second resin supply part 52 may be disposed on the other side surface (e.g., an opposing side surface) of the switchable lens layer PT. For example, the second resin supply part 52 may be disposed on the other side surface of the switchable lens layer PT in the second direction DR2. The second resin supply part 52 is substantially the same as the first resin supply part 51, and thus, redundant or repetitive descriptions may be omitted or briefly discussed.

A first magnetic field generation part 61 may be disposed on one side surface of the first resin supply part 51. For example, the first magnetic field generation part 61 may be disposed on one side surface of the first resin supply part 51 in the second direction DR2. The first magnetic field generation part 61 does not generate a magnetic field in the first mode, and may generate a magnetic field in the second mode. Accordingly, the first magnetic field generation part 61 may move the resin RS from the first resin supply part 51 to the switchable lens layer PT in the 3D mode or store the resin RS in the first resin supply part 51 in the 2D mode.

A second magnetic field generation part 62 may be disposed on one side surface of the second resin supply part 52. For example, the second magnetic field generation part 62 may be disposed on one side surface of the second resin supply part 52 in the second direction DR2. The second magnetic field generation part 62 does not generate a magnetic field in the first mode, and may generate a magnetic field in the second mode. Accordingly, the second magnetic field, generation part 62 may move the resin RS from the second resin supply part 52 to the switchable lens layer PT in the 3D mode or store the resin RS in the second resin supply part 52 in the 2D mode.

Also in the embodiment, when the switchable lens layer PT has the shape of the lens, the display device 1 may provide a stereoscopic image. In addition, when the switchable lens layer PT has the flat shape, the display device 1 may provide a plane image.

While the present invention has been described with reference to the embodiments thereof, it will be understood by those of ordinary skill in the art that various changes in form and detail may be made thereto without departing from the spirit and scope of the present invention.

What is claimed is:

1. A display device comprising:
a display panel displaying a three-dimensional (3D) image in a first mode and displaying a two-dimensional (2D) image in a second mode;
a switchable lens layer disposed on the display panel;
a resin supply part connected to the switchable lens layer and supplying the resin to the switchable lens layer; and
a magnetic field generator applying a magnetic field to the resin supply part when in the second mode,
wherein the resin moves from the resin supply part to the switchable lens layer when in the first mode and is stored in the resin supply part when in the second mode.

2. The display device of claim 1,
wherein a first surface of the switchable lens layer has a plurality of lenses in the first mode, and has a flat shape in the second mode.

3. The display device of claim 2,
wherein a first length of the first surface of the switchable lens layer in a first direction in the first mode is greater than a second length of the first surface of the switchable lens layer in the first direction, in the second mode.

4. The display device of claim 2,
wherein in the first mode, any one of the plurality of lenses has a curved shape.

5. The display device of claim 2, further comprising
a cover window disposed on the switchable lens layer and having a shape complementary to a shape of the plurality of lenses.

6. The display device of claim 5,
wherein the switchable lens layer is in contact with the cover window in the first mode.

7. The display device of claim 5, further comprising
a space between the switchable lens layer and the cover window in the second mode.

8. The display device of claim 2,
further comprising a plurality of fixing pins disposed on the switchable lens layer and extending in a first direction,
wherein a pitch of the plurality of lenses is defined in a second direction crossing the first direction.

9. The display device of claim 8,
wherein each of the plurality of fixing pins is disposed between lenses neighboring to each other among the plurality of lenses, in the first mode.

10. The display device of claim 8,
wherein the display panel includes a plurality of pixels each including an emission area, and the plurality of fixing pins do not overlap the emission area.

11. The display device of claim 8,
wherein the plurality of fixing pins include a transparent material.

12. The display device of claim 1,
wherein the resin includes a material that moves according to the magnetic field.

13. The display device of claim 12,
wherein the resin includes $ZrO_2$ or $Fe_3O_4$.

14. The display device of claim 1, further comprising:
a connection part connected to the switchable lens layer; and
a winding part connected to the connection part, wherein the winding part unwinds the connection part when in the first mode, and winds the connection part when in the second mode.

15. A display device comprising:
a display panel displaying a 3D image in a first mode and displaying a 2D image in a second mode;
a switchable lens layer disposed on the display panel;
a plurality of fixing pins disposed on the switchable lens layer; and
a resin supply part connected to the switchable lens layer and supplying the resin to the switchable lens layer,
wherein the switchable lens layer has a plurality of lenses in the first mode because the resin moves from the resin supply part to the switchable lens layer in the first mode, and the switchable lens layer has a flat shape in the second mode because the resin is stored in the resin supply part in the second mode, and
each of the plurality of fixing pins is disposed between lenses neighboring to each other among the plurality of lenses.

16. The display device of claim 15,
wherein the display panel includes a plurality of pixels each including an emission area, and the plurality of fixing pins do not overlap the plurality of emission areas.

17. The display device of claim 15,
wherein in the first mode, any one of the plurality of lenses has a curved shape.

18. The display device of claim 15, further comprising:
a connection part connected to the switchable lens layer; and a winding part connected to the connection part, wherein the winding part unwinds the connection part when in the first mode, and winds the connection part when in the second mode.

19. A display device comprising:
a display panel displaying a 3D image in a first mode and displaying a 2D image in a second mode;
a switchable lens layer disposed on the display panel;
a cover window disposed on the switchable lens layer and including a plurality of grooves facing the switchable lens layer; and
a resin supply part connected to the switchable lens layer and supplying the resin to the switchable lens layer,
wherein the switchable lens layer has a plurality of curves because the resin move from the resin supply part to the switchable lens layer in the first mode, and has a flat shape because the resin is stored in the resin supply part in the second mode, and
wherein the cover window is disposed on the switchable lens layer and has a shape complementary to a shape of the plurality of curves.

20. The display device of claim 19,
wherein the cover window is in contact with the switchable lens layer in the first mode.

* * * * *